United States Patent
Yerramalli et al.

(10) Patent No.: US 11,595,993 B2
(45) Date of Patent: Feb. 28, 2023

(54) JOINT CHANNEL SENSING OPERATIONS FOR A WIRELESS COMMUNICATION SYSTEM

(71) Applicant: QUALCOMM Incorporated, San Diego, CA (US)

(72) Inventors: Srinivas Yerramalli, Hyderabad (IN); Vinay Chande, San Diego, CA (US); Arumugam Chendamarai Kannan, San Diego, CA (US); Jing Sun, San Diego, CA (US); Xiaoxia Zhang, San Diego, CA (US); Tao Luo, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 199 days.

(21) Appl. No.: 17/178,549

(22) Filed: Feb. 18, 2021

(65) Prior Publication Data

US 2021/0266961 A1    Aug. 26, 2021

Related U.S. Application Data

(60) Provisional application No. 62/979,927, filed on Feb. 21, 2020.

(51) Int. Cl.
  *H04W 74/08* (2009.01)
  *H04W 72/04* (2023.01)
  *H04L 5/00* (2006.01)

(52) U.S. Cl.
  CPC ....... *H04W 74/0808* (2013.01); *H04L 5/0055* (2013.01); *H04W 72/0413* (2013.01)

(58) Field of Classification Search
  CPC .......... H04W 74/0808; H04W 72/0413; H04L 5/0055
  See application file for complete search history.

(56) References Cited

U.S. PATENT DOCUMENTS

| | | | |
|---|---|---|---|
| 2015/0365206 A1* | 12/2015 | Yaacoub | H04L 5/0035 370/329 |
| 2017/0331714 A1* | 11/2017 | Yang | H04W 74/0808 |
| 2019/0053278 A1* | 2/2019 | Kecicioglu | H04B 7/02 |
| 2021/0266961 A1* | 8/2021 | Yerramalli | H04W 72/0413 |
| 2021/0314780 A1* | 10/2021 | Tomeba | H04B 7/0695 |
| 2021/0360696 A1* | 11/2021 | Chendamarai Kannan | H04W 74/0808 |
| 2022/0039155 A1* | 2/2022 | Hakola | H04W 74/0808 |
| 2022/0116992 A1* | 4/2022 | Omiya | H04W 16/28 |
| 2022/0167408 A1* | 5/2022 | Lee | H04W 74/0808 |
| 2022/0287093 A1* | 9/2022 | Iyer | H04B 7/0695 |

* cited by examiner

*Primary Examiner* — Michael J Moore, Jr.
(74) *Attorney, Agent, or Firm* — Norton Rose Fulbright US LLP/Qualcomm Incorporated

(57) ABSTRACT

A method of wireless communication includes performing, by a user equipment (UE) device, a channel sensing operation during a first window of a frame period associated with a wireless communication network. Performing the channel sensing operation includes performing a direction-based scan of one or more beams associated with the wireless communication network, and the channel sensing operation is included in a joint sensing operation performed with a base station. The method further includes, based at least in part on a result of the channel sensing operation, determining whether to perform, during a second window of the frame period, one or more communication operations with the base station.

30 Claims, 10 Drawing Sheets

JOINT CHANNEL SENSING OPERATIONS FOR A WIRELESS COMMUNICATION SYSTEM

CROSS-REFERENCE TO RELATED APPLICATION

This application claims the benefit of and priority to U.S. Prov. Pat. App. No. 62/979,927, entitled "JOINT CHANNEL SENSING OPERATIONS FOR A WIRELESS COMMUNICATION SYSTEM" and filed on Feb. 21, 2020, which is incorporated by reference herein in its entirety.

TECHNICAL FIELD

Aspects of the present disclosure relate generally to wireless communication systems, and more particularly, to channel sensing operations for wireless communication systems.

BACKGROUND

Wireless communication networks are widely deployed to provide various communication services such as voice, video, packet data, messaging, broadcast, and the like. These wireless networks may be multiple-access networks capable of supporting multiple users by sharing the available network resources. Such networks, which are usually multiple access networks, support communications for multiple users by sharing the available network resources. One example of such a network is the Universal Terrestrial Radio Access Network (UTRAN). The UTRAN is the radio access network (RAN) defined as a part of the Universal Mobile Telecommunications System (UMTS), a third generation (3G) mobile phone technology supported by the 3rd Generation Partnership Project (3GPP). Examples of multiple-access network formats include Code Division Multiple Access (CDMA) networks, Time Division Multiple Access (TDMA) networks, Frequency Division Multiple Access (FDMA) networks, Orthogonal FDMA (OFDMA) networks, and Single-Carrier FDMA (SC-FDMA) networks.

A wireless communication network may include a number of base stations or node Bs that can support communication for a number of user equipments (UEs). A UE may communicate with a base station via downlink and uplink. The downlink (or forward link) refers to the communication link from the base station to the UE, and the uplink (or reverse link) refers to the communication link from the UE to the base station.

A base station may transmit data and control information on the downlink to a UE and/or may receive data and control information on the uplink from the UE. On the downlink, a transmission from the base station may encounter interference due to transmissions from neighbor base stations or from other wireless radio frequency (RF) transmitters. On the uplink, a transmission from the UE may encounter interference from uplink transmissions of other UEs communicating with the neighbor base stations or from other wireless RF transmitters. This interference may degrade performance on both the downlink and uplink.

As the demand for mobile broadband access continues to increase, the possibilities of interference and congested networks grows with more UEs accessing the long-range wireless communication networks and more short-range wireless systems being deployed in communities. Research and development continue to advance wireless technologies not only to meet the growing demand for mobile broadband access, but to advance and enhance the user experience with mobile communications.

SUMMARY

In one aspect of the disclosure, a method of wireless communication includes performing, by a user equipment (UE) device, a channel sensing operation during a first window of a frame period associated with a wireless communication network. Performing the channel sensing operation includes performing a direction-based scan of one or more beams associated with the wireless communication network, and the channel sensing operation is included in a joint sensing operation performed with a base station. The method further includes, based at least in part on a result of the channel sensing operation, determining whether to perform, during a second window of the frame period, one or more communication operations with the base station.

In an additional aspect of the disclosure, a method of wireless communication includes performing, by a base station, a channel sensing operation during a first window of a frame period associated with a wireless communication network. Performing the channel sensing operation includes performing a direction-based scan of one or more beams associated with the wireless communication network, and the channel sensing operation is included in a joint sensing operation performed with a UE device. The method further includes determining, based at least in part on a result of the channel sensing operation, whether to perform, during a second window of the frame period, one or more communication operations with the UE device.

In an additional aspect of the disclosure, an apparatus for wireless communication includes at least one processor and a memory coupled to the at least one processor. The at least one processor is configured to initiate a channel sensing operation at a UE device during a first window of a frame period associated with a wireless communication network. Performing the channel sensing operation includes performing a direction-based scan of one or more beams associated with the wireless communication network, and the channel sensing operation is included in a joint sensing operation performed with a base station. The at least one processor is further configured to determine, based at least in part on a result of the channel sensing operation, whether to perform, during a second window of the frame period, one or more communication operations with the base station.

In an additional aspect of the disclosure, an apparatus for wireless communication includes at least one processor and a memory coupled to the at least one processor. The at least one processor is configured to initiate a channel sensing operation at a base station during a first window of a frame period associated with a wireless communication network. Performing the channel sensing operation includes performing a direction-based scan of one or more beams associated with the wireless communication network, and the channel sensing operation is included in a joint sensing operation performed with a UE device. The at least one processor is further configured to determine, based at least in part on a result of the channel sensing operation, whether to perform, during a second window of the frame period, one or more communication operations with the UE device.

BRIEF DESCRIPTION OF THE DRAWINGS

A further understanding of the nature and advantages of the present disclosure may be realized by reference to the following drawings. In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label.

DETAILED DESCRIPTION

Figure 1:
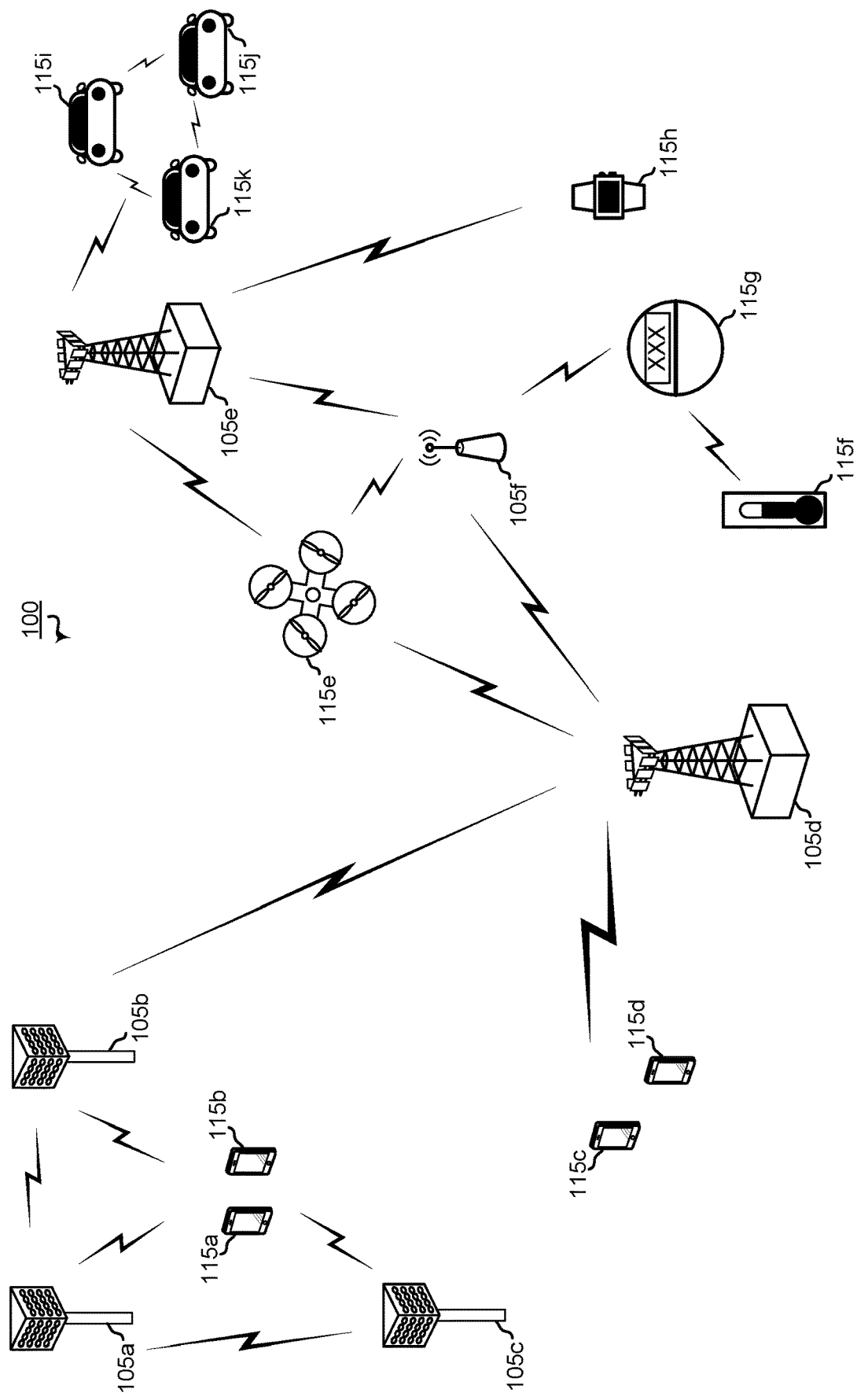
FIG. 1 is a block diagram illustrating an example of a wireless communication system configured to perform joint sensing operations in accordance with some aspects of the disclosure.

As the number of wireless communications has increased, bandwidth usage efficiency in wireless communication systems has become more important. For example, mobile communication devices (e.g., cellular telephones), vehicles, wearable devices, sensors, and other devices may use wireless networks to communicate data. As the number of these devices increases, noise and interference in a wireless communication network may increase, reducing signal quality and potentially reducing speed or quality of communications.

To increase bandwidth usage efficiency, some cellular communication systems use "unlicensed" frequency spectrum associated with other wireless communication networks, such as frequency spectrum associated with a wireless local area network (WLAN). To illustrate, a fourth-generation unlicensed long-term evolution (4G LTE-U) wireless communication network or a fifth-generation new radio unlicensed (5G NR-U) wireless communication network may "borrow" frequency spectrum associated with a WLAN.

In order to "borrow" the frequency spectrum, a base station or a user equipment (UE) device may perform a channel access monitoring operation, such as by monitoring a network medium (e.g., one or more channels) to determine if another device is using the network medium. If no other device is detected (e.g., if the network medium is idle or "clear"), then the base station or UE device may use the network medium for communication. Alternatively, if use of the network medium by one or more other devices is detected, then the base station or UE device may refrain from using the network medium (until detecting that the network medium is idle).

Performing channel access monitoring operations consumes power. For example, a channel access monitoring operation may include activating a receiver to receive signals, amplifying the signals using one or more amplifiers, and then processing the signals (e.g., to identify an amount of energy associated with the signals). As a result, many wireless communication techniques avoid use of unlicensed spectrum to avoid increased power consumption associated with channel access monitoring operations.

In accordance with an aspect of the disclosure, a base station and a UE device perform a joint sensing operation to jointly determine whether one or more communication operations are to be performed. The joint sensing operation may include a channel sensing operation (e.g., a frame-based equipment (FBE) listen-before-talk (LBT) operation) performed by the base station and may further include a channel sensing operation (e.g., an FBE LBT operation) performed by the UE device. The joint sensing operation may be performed to monitor a network medium during a first window of a frame period to determine what (if any) communications are to occur during a second window of the frame period. The joint sensing operation may include performing direction-based scans of one or more beams. The joint sensing operation may depend on a result of the channel sensing operation performed by the base station and may further depend on a result of the channel sensing operation performed by the UE device.

To illustrate, if both channel sensing operations indicate that the network medium is busy (e.g., by detecting one or more beams sent via the network medium), then the base station and the UE may avoid communication during the frame period. In another example, if the channel sensing operation performed by the base station indicates that the network medium is idle, then the base station may transmit a message to the UE device (e.g., a request or invitation to accept an upcoming data communication from the base station). Depending on the result of the channel sensing operation performed by the UE device, the UE device may acknowledge the message (e.g., if the UE device detects that the network medium is idle) or may ignore the message (e.g., if UE device detects that the network medium is busy). As an additional example, if the channel sensing operation performed by the base station indicates the network medium is busy and the channel sensing operation performed by the UE device indicates the network medium is idle, then the base station may decline to acknowledge a message sent by the UE device to the base station.

In some examples, communications during the second window of the frame period may be performed according to a "passive UE" technique (e.g., where the UE is eligible to receive data from but not to transmit data to the base station). In another example, communications during the second window of the frame period are performed according to an "active UE" technique (e.g., where the UE is eligible both to receive data from and to transmit data to the base station).

A joint sensing operation in accordance with aspects of the disclosure may reduce power consumption associated with channel access monitoring operations. For example, by monitoring a network medium during a first window (but not during a second window) of a frame period, power consumption can be reduced as compared to techniques that monitor an access medium during an entire frame period.

Further, a joint sensing operation in accordance with aspects of the disclosure may enable coordinated transmissions and generation of a stable interference profile. For example, by monitoring a channel medium both at the mobile-side and at the network-side, network measurements may be less localized and more robust (e.g., more "stable"). As a result, communications may be coordinated across multiple devices (instead of by a single device), resulting in better throughput and improved rate prediction in a wireless communication system in some cases.

As an additional benefit, in some millimeter wave (mm-Wave) communication systems, the probability of detecting interference for a particular beam may be relatively low (since for example, the probability of interference propagating in a particular direction that matches the beam may be relatively low). In this case, instances of unacknowledged messages (e.g., where a base station transmits a message in response to detecting that a network medium is idle, and where a UE device declines to acknowledge the message in response to detecting that the network medium is busy) may be relatively infrequent. As a result, communication efficiency is increased in a mmWave communication system that uses a joint sensing technique in accordance with aspects of the disclosure.

To further illustrate certain aspects, this disclosure relates generally to providing or participating in authorized shared access between two or more wireless communications systems, also referred to as wireless communications networks. In various embodiments, the techniques and apparatus may be used for wireless communication networks such as code division multiple access (CDMA) networks, time division multiple access (TDMA) networks, frequency division multiple access (FDMA) networks, orthogonal FDMA (OFDMA) networks, single-carrier FDMA (SC-FDMA) networks, LTE networks, GSM networks, 5th Generation (5G) or new radio (NR) networks, as well as other communications networks. As described herein, the terms "networks" and "systems" may be used interchangeably.

An OFDMA network may implement a radio technology such as evolved UTRA (E-UTRA), IEEE 802.11, IEEE 802.16, IEEE 802.20, flash-OFDM and the like. UTRA, E-UTRA, and Global System for Mobile Communications (GSM) are part of universal mobile telecommunication system (UMTS). In particular, long term evolution (LTE) is a release of UMTS that uses E-UTRA. UTRA, E-UTRA, GSM, UMTS and LTE are described in documents provided from an organization named "3rd Generation Partnership Project" (3GPP), and cdma2000 is described in documents from an organization named "3rd Generation Partnership Project 2" (3GPP2). These various radio technologies and standards are known or are being developed. For example, the 3rd Generation Partnership Project (3GPP) is a collaboration between groups of telecommunications associations that aims to define a globally applicable third generation (3G) mobile phone specification. 3GPP long term evolution (LTE) is a 3GPP project which was aimed at improving the universal mobile telecommunications system (UMTS) mobile phone standard. The 3GPP may define specifications for the next generation of mobile networks, mobile systems, and mobile devices. The present disclosure is concerned with the evolution of wireless technologies from LTE, 4G, 5G, NR, and beyond with shared access to wireless spectrum between networks using a collection of new and different radio access technologies or radio air interfaces.

In particular, 5G networks contemplate diverse deployments, diverse spectrum, and diverse services and devices that may be implemented using an OFDM-based unified, air interface. In order to achieve these goals, further enhancements to LTE and LTE-A are considered in addition to development of the new radio technology for 5G NR networks. The 5G NR will be capable of scaling to provide coverage (1) to a massive Internet of things (IoTs) with an ultra-high density (e.g., ~1 M nodes/km^2), ultra-low complexity (e.g., ~10 s of bits/sec), ultra-low energy (e.g., ~10+ years of battery life), and deep coverage with the capability to reach challenging locations; (2) including mission-critical control with strong security to safeguard sensitive personal, financial, or classified information, ultra-high reliability (e.g., ~99.9999% reliability), ultra-low latency (e.g., ~1 ms), and users with wide ranges of mobility or lack thereof; and (3) with enhanced mobile broadband including extreme high capacity (e.g., ~10 Tbps/km^2), extreme data rates (e.g., multi-Gbps rate, 100+ Mbps user experienced rates), and deep awareness with advanced discovery and optimizations.

Devices, networks, and systems may be configured to communicate via one or more portions of the electromagnetic spectrum. The electromagnetic spectrum is often subdivided, based on frequency or wavelength, into various classes, bands, channels, etc. In 5G NR two initial operating bands have been identified as frequency range designations FR1 (410 MHz-7.125 GHz) and FR2 (24.25 GHz-52.6 GHz). The frequencies between FR1 and FR2 are often referred to as mid-band frequencies. Although a portion of FR1 is greater than 6 GHz, FR1 is often referred to (interchangeably) as a "sub-6 GHz" band in various documents and articles. A similar nomenclature issue sometimes occurs with regard to FR2, which is often referred to (interchangeably) as a "millimeter wave" (mmWave) band in documents and articles, despite being different from the extremely high frequency (EHF) band (30 GHz-300 GHz) which is identified by the International Telecommunications Union (ITU) as a "mmWave" band.

With the above aspects in mind, unless specifically stated otherwise, it should be understood that the term "sub-6 GHz" or the like if used herein may broadly represent frequencies that may be less than 6 GHz, may be within FR1, or may include mid-band frequencies. Further, unless specifically stated otherwise, it should be understood that the term "mmWave" or the like if used herein may broadly represent frequencies that may include mid-band frequencies, may be within FR2, or may be within the EHF band.

The 5G NR may be implemented to use optimized OFDM-based waveforms with scalable numerology and transmission time interval (TTI); having a common, flexible framework to efficiently multiplex services and features with a dynamic, low-latency time division duplex (TDD)/frequency division duplex (FDD) design; and with advanced wireless technologies, such as massive multiple input, multiple output (MIMO), robust millimeter wave (mmWave) transmissions, advanced channel coding, and device-centric mobility. Scalability of the numerology in 5G NR, with scaling of subcarrier spacing, may efficiently address operating diverse services across diverse spectrum and diverse deployments. For example, in various outdoor and macro coverage deployments of less than 3 GHz FDD/TDD implementations, subcarrier spacing may occur with 15 kHz, for example over 1, 5, 10, 20 MHz, and the like bandwidth. For other various outdoor and small cell coverage deployments of TDD greater than 3 GHz, subcarrier spacing may occur with 30 kHz over 80/100 MHz bandwidth. For other various indoor wideband implementations, using a TDD over the unlicensed portion of the 5 GHz band, the subcarrier spacing may occur with 60 kHz over a 160 MHz bandwidth. Finally, for various deployments transmitting with mmWave components at a TDD of 28 GHz, subcarrier spacing may occur with 120 kHz over a 500 MHz bandwidth.

The scalable numerology of the 5G NR facilitates scalable TTI for diverse latency and quality of service (QoS) requirements. For example, shorter TTI may be used for low latency and high reliability, while longer TTI may be used for higher spectral efficiency. The efficient multiplexing of long and short TTIs to allow transmissions to start on symbol boundaries. 5G NR also contemplates a self-contained integrated subframe design with uplink/downlink scheduling information, data, and acknowledgement in the same subframe. The self-contained integrated subframe supports communications in unlicensed or contention-based shared spectrum, adaptive uplink/downlink that may be flexibly configured on a per-cell basis to dynamically switch between uplink and downlink to meet the current traffic needs.

Various other aspects and features of the disclosure are further described below. It should be apparent that the teachings herein may be embodied in a wide variety of forms and that any specific structure, function, or both being disclosed herein is merely representative and not limiting. Based on the teachings herein one of an ordinary level of skill in the art should appreciate that an aspect disclosed herein may be implemented independently of any other aspects and that two or more of these aspects may be combined in various ways. For example, an apparatus may be implemented or a method may be practiced using any number of the aspects set forth herein. In addition, such an apparatus may be implemented or such a method may be practiced using other structure, functionality, or structure and functionality in addition to or other than one or more of the aspects set forth herein. For example, a method may be implemented as part of a system, device, apparatus, and/or as instructions stored on a computer readable medium for execution on a processor or computer. Furthermore, an aspect may comprise at least one element of a claim.

FIG. 1 is a block diagram illustrating 5G network 100 including various base stations and UEs configured according to aspects of the present disclosure. The 5G network 100 includes a number of base stations 105 and other network entities. A base station may be a station that communicates with the UEs and may also be referred to as an evolved node B (eNB), a next generation eNB (gNB), an access point, and the like. Each base station 105 may provide communication coverage for a particular geographic area. In 3GPP, the term "cell" can refer to this particular geographic coverage area of a base station and/or a base station subsystem serving the coverage area, depending on the context in which the term is used.

A base station may provide communication coverage for a macro cell or a small cell, such as a pico cell or a femto cell, and/or other types of cell. A macro cell generally covers a relatively large geographic area (e.g., several kilometers in radius) and may allow unrestricted access by UEs with service subscriptions with the network provider. A small cell, such as a pico cell, would generally cover a relatively smaller geographic area and may allow unrestricted access by UEs with service subscriptions with the network provider. A small cell, such as a femto cell, would also generally cover a relatively small geographic area (e.g., a home) and, in addition to unrestricted access, may also provide restricted access by UEs having an association with the femto cell (e.g., UEs in a closed subscriber group (CSG), UEs for users in the home, and the like). A base station for a macro cell may be referred to as a macro base station. A base station for a small cell may be referred to as a small cell base station, a pico base station, a femto base station or a home base station. In the example shown in FIG. 1, the base stations 105d and 105e are regular macro base stations, while base stations 105a-105c are macro base stations enabled with one of 3 dimension (3D), full dimension (FD), or massive MIMO. Base stations 105a-105c take advantage of their higher dimension MIMO capabilities to exploit 3D beamforming in both elevation and azimuth beamforming to increase coverage and capacity. Base station 105f is a small cell base station which may be a home node or portable access point. A base station may support one or multiple (e.g., two, three, four, and the like) cells.

The 5G network 100 may support synchronous or asynchronous operation. For synchronous operation, the base stations may have similar frame timing, and transmissions from different base stations may be approximately aligned in time. For asynchronous operation, the base stations may have different frame timing, and transmissions from different base stations may not be aligned in time.

The UEs 115 are dispersed throughout the wireless network 100, and each UE may be stationary or mobile. A UE may also be referred to as a terminal, a mobile station, a subscriber unit, a station, or the like. A UE may be a cellular phone, a personal digital assistant (PDA), a wireless modem, a wireless communication device, a handheld device, a tablet computer, a laptop computer, a cordless phone, a wireless local loop (WLL) station, or the like. In one aspect, a UE may be a device that includes a Universal Integrated Circuit Card (UICC). In another aspect, a UE may be a device that does not include a UICC. In some aspects, UEs that do not include UICCs may also be referred to as internet of everything (IoE) or internet of things (IoT) devices. UEs 115a-115d are examples of mobile smart phone-type devices accessing 5G network 100 A UE may also be a machine specifically configured for connected communication, including machine type communication (MTC), enhanced MTC (eMTC), narrowband IoT (NB-IoT) and the like. UEs 115e-115k are examples of various machines configured for communication that access 5G network 100. A UE may be able to communicate with any type of the base stations, whether macro base station, small cell, or the like. In FIG. 1, a lightning bolt (e.g., communication links) indicates wireless transmissions between a UE and a serving base station, which is a base station designated to serve the UE on the downlink and/or uplink, or desired transmission between base stations, and backhaul transmissions between base stations.

In operation at 5G network 100, base stations 105a-105c serve UEs 115a and 115b using 3D beamforming and coordinated spatial techniques, such as coordinated multi-point (CoMP) or multi-connectivity. Macro base station 105d performs backhaul communications with base stations 105a-105c, as well as small cell, base station 105f. Macro base station 105d also transmits multicast services which are subscribed to and received by UEs 115c and 115d. Such multicast services may include mobile television or stream video, or may include other services for providing community information, such as weather emergencies or alerts, such as Amber alerts or gray alerts.

5G network 100 also support mission critical communications with ultra-reliable and redundant links for mission critical devices, such as UE 115e, which is a drone. Redundant communication links with UE 115e include from macro base stations 105d and 105e, as well as small cell base station 105f. Other machine type devices, such as UE 115f (thermometer), UE 115g (smart meter), and UE 115h (wearable device) may communicate through 5G network 100 either directly with base stations, such as small cell base station 105f, and macro base station 105e, or in multi-hop configurations by communicating with another user device which relays its information to the network, such as UE 115f communicating temperature measurement information to the smart meter, UE 115g, which is then reported to the network through small cell base station 105f. 5G network 100 may also provide additional network efficiency through dynamic, low-latency TDD/FDD communications, such as in a vehicle-to-vehicle (V2V) mesh network between UEs 115i-115k communicating with macro base station 105e.

Figure 2:
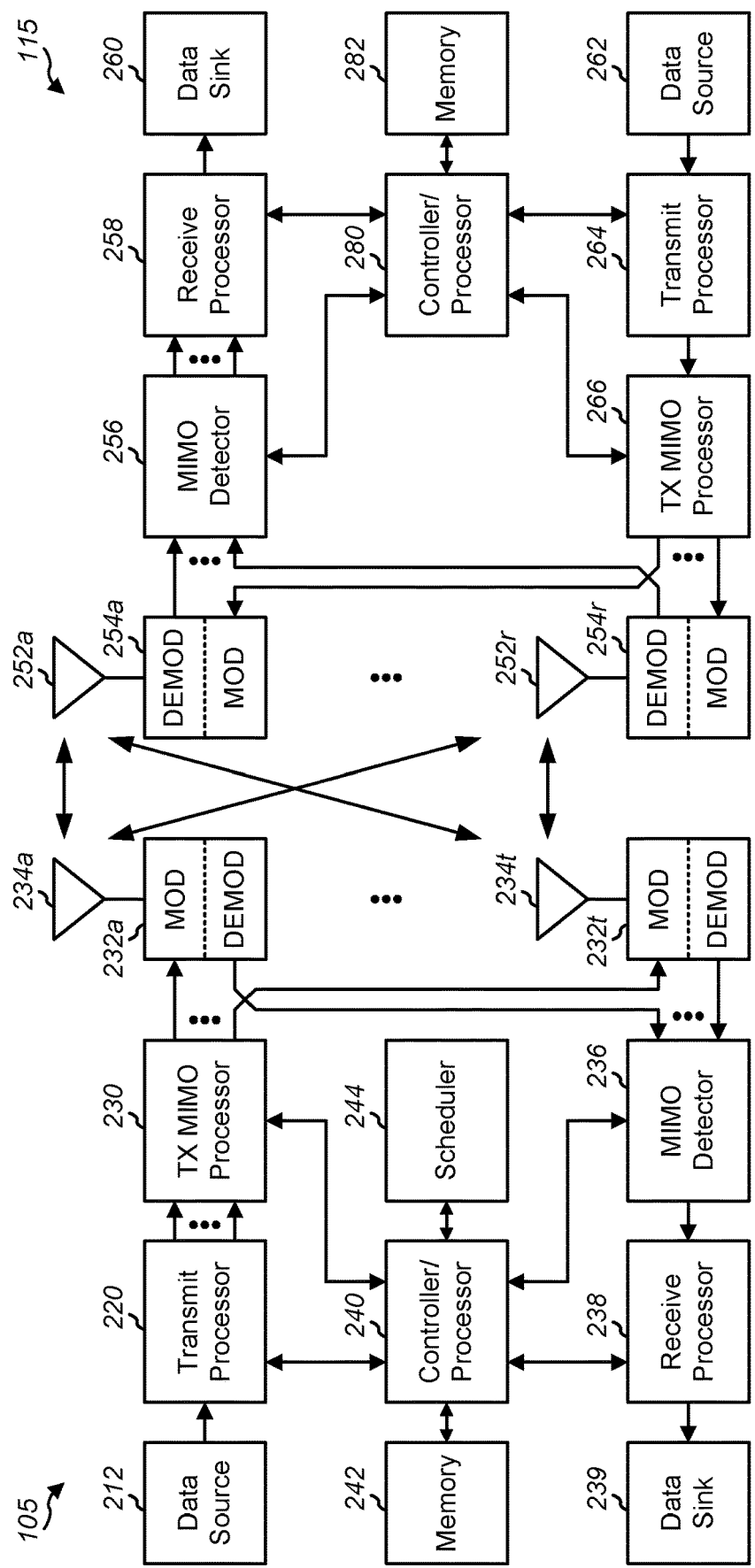
FIG. 2 is a block diagram illustrating examples of a base station and a UE that are configured to perform joint sensing operations in accordance with some aspects of the disclosure.

FIG. 2 shows a block diagram of a design of a base station 105 and a UE 115, which may be one of the base stations and one of the UEs in FIG. 1. At the base station 105, a transmit processor 220 may receive data from a data source 212 and control information from a controller/processor 240. The control information may be for the PBCH, PCFICH, PHICH, PDCCH, EPDCCH, MPDCCH etc. The data may be for the PDSCH, etc. The transmit processor 220 may process (e.g., encode and symbol map) the data and control information to obtain data symbols and control symbols, respectively. The transmit processor 220 may also generate reference symbols, e.g., for the PSS, SSS, and cell-specific reference signal. A transmit (TX) multiple-input multiple-output (MIMO) processor 230 may perform spatial processing (e.g., precoding) on the data symbols, the control symbols, and/or the reference symbols, if applicable, and may provide output symbol streams to the modulators (MODs) 232a through 232t. Each modulator 232 may process a respective output symbol stream (e.g., for OFDM, etc.) to obtain an output sample stream. Each modulator 232 may further process (e.g., convert to analog, amplify, filter, and upconvert) the output sample stream to obtain a downlink signal. Downlink signals from modulators 232a through 232t may be transmitted via the antennas 234a through 234t, respectively.

At the UE 115, the antennas 252a through 252r may receive the downlink signals from the base station 105 and may provide received signals to the demodulators (DEMODs) 254a through 254r, respectively. Each demodulator 254 may condition (e.g., filter, amplify, downconvert, and digitize) a respective received signal to obtain input samples. Each demodulator 254 may further process the input samples (e.g., for OFDM, etc.) to obtain received symbols. A MIMO detector 256 may obtain received symbols from all the demodulators 254a through 254r, perform MIMO detection on the received symbols if applicable, and provide detected symbols. A receive processor 258 may process (e.g., demodulate, deinterleave, and decode) the detected symbols, provide decoded data for the UE 115 to a data sink 260, and provide decoded control information to a controller/processor 280.

On the uplink, at the UE 115, a transmit processor 264 may receive and process data (e.g., for the PUSCH) from a data source 262 and control information (e.g., for the PUCCH) from the controller/processor 280. The transmit processor 264 may also generate reference symbols for a reference signal. The symbols from the transmit processor 264 may be precoded by a TX MIMO processor 266 if applicable, further processed by the modulators 254a through 254r (e.g., for SC-FDM, etc.), and transmitted to the base station 105. At the base station 105, the uplink signals from the UE 115 may be received by the antennas 234, processed by the demodulators 232, detected by a MIMO detector 236 if applicable, and further processed by a receive processor 238 to obtain decoded data and control information sent by the UE 115. The receive processor 238 may provide the decoded data to a data sink 239 and the decoded control information to the controller/processor 240.

The controllers/processors 240 and 280 may direct the operation at the base station 105 and the UE 115, respectively. The controller/processor 240 and/or other processors and modules at the base station 105 may perform or direct the execution of various processes for the techniques described herein. The controllers/processor 280 and/or other processors and modules at the UE 115 may also perform or direct the execution of the functional blocks illustrated in FIGS. 6 and 7 and/or other processes for the techniques described herein. The memories 242 and 282 may store data and program codes for the base station 105 and the UE 115, respectively. A scheduler 244 may schedule UEs for data transmission on the downlink and/or uplink.

Wireless communications systems operated by different network operating entities (e.g., network operators) may share spectrum. In some instances, a network operating entity may be configured to use an entirety of a designated shared spectrum for at least a period of time before another network operating entity uses the entirety of the designated shared spectrum for a different period of time. Thus, in order to allow network operating entities use of the full designated shared spectrum, and in order to mitigate interfering communications between the different network operating entities, certain resources (e.g., time) may be partitioned and allocated to the different network operating entities for certain types of communication.

For example, a network operating entity may be allocated certain time resources reserved for exclusive communication by the network operating entity using the entirety of the shared spectrum. The network operating entity may also be allocated other time resources where the entity is given priority over other network operating entities to communicate using the shared spectrum. These time resources, prioritized for use by the network operating entity, may be utilized by other network operating entities on an opportunistic basis if the prioritized network operating entity does not utilize the resources. Additional time resources may be allocated for any network operator to use on an opportunistic basis.

Access to the shared spectrum and the arbitration of time resources among different network operating entities may be centrally controlled by a separate entity, autonomously determined by a predefined arbitration scheme, or dynamically determined based on interactions between wireless nodes of the network operators.

In some cases, UE 115 and base station 105 of the 5G network 100 (in FIG. 1) may operate in a shared radio frequency spectrum band, which may include licensed or unlicensed (e.g., contention-based) frequency spectrum. In an unlicensed frequency portion of the shared radio frequency spectrum band, UEs 115 or base stations 105 may traditionally perform a medium-sensing procedure to contend for access to the frequency spectrum. For example, UE 115 or base station 105 may perform a listen before talk (LBT) procedure such as a clear channel assessment (CCA) prior to communicating in order to determine whether the shared channel is available. A CCA may include an energy detection procedure to determine whether there are any other active transmissions. For example, a device may infer that a change in a received signal strength indicator (RSSI) of a power meter indicates that a channel is occupied. Specifically, signal power that is concentrated in a certain bandwidth and exceeds a predetermined noise floor may indicate another wireless transmitter. A CCA also may include detection of specific sequences that indicate use of the channel. For example, another device may transmit a specific preamble prior to transmitting a data sequence. In some cases, an LBT procedure may include a wireless node adjusting its own backoff window based on the amount of energy detected on a channel and/or the acknowledge/negative-acknowledge (ACK/NACK) feedback for its own transmitted packets as a proxy for collisions.

In general, four categories of LBT procedure have been suggested for sensing a shared channel for signals that may indicate the channel is already occupied. In a first category (CAT 1 LBT), no LBT or CCA is applied to detect occupancy of the shared channel. A second category (CAT 2 LBT), which may also be referred to as an abbreviated LBT, a single-shot LBT, or a 25-μs LBT, provides for the node to perform a CCA to detect energy above a predetermined threshold or detect a message or preamble occupying the shared channel. The CAT 2 LBT performs the CCA without using a random back-off operation, which results in its abbreviated length, relative to the next categories.

A third category (CAT 3 LBT) performs CCA to detect energy or messages on a shared channel, but also uses a random back-off and fixed contention window. Therefore, when the node initiates the CAT 3 LBT, it performs a first CCA to detect occupancy of the shared channel. If the shared channel is idle for the duration of the first CCA, the node may proceed to transmit. However, if the first CCA detects a signal occupying the shared channel, the node selects a random back-off based on the fixed contention window size and performs an extended CCA. If the shared channel is detected to be idle during the extended CCA and the random number has been decremented to 0, then the node may begin transmission on the shared channel. Otherwise, the node decrements the random number and performs another extended CCA. The node would continue performing extended CCA until the random number reaches 0. If the random number reaches 0 without any of the extended CCAs detecting channel occupancy, the node may then transmit on the shared channel. If at any of the extended CCA, the node detects channel occupancy, the node may re-select a new random back-off based on the fixed contention window size to begin the countdown again.

A fourth category (CAT 4 LBT), which may also be referred to as a full LBT procedure, performs the CCA with energy or message detection using a random back-off and variable contention window size. The sequence of CCA detection proceeds similarly to the process of the CAT 3 LBT, except that the contention window size is variable for the CAT 4 LBT procedure.

Use of a medium-sensing procedure to contend for access to an unlicensed shared spectrum may result in communication inefficiencies. This may be particularly evident when multiple network operating entities (e.g., network operators) are attempting to access a shared resource. In the 5G network 100, base stations 105 and UEs 115 may be operated by the same or different network operating entities.

In some examples, an individual base station 105 or UE 115 may be operated by more than one network operating entity. In other examples, each base station 105 and UE 115 may be operated by a single network operating entity. Requiring each base station 105 and UE 115 of different network operating entities to contend for shared resources may result in increased signaling overhead and communication latency.

Figure 3:
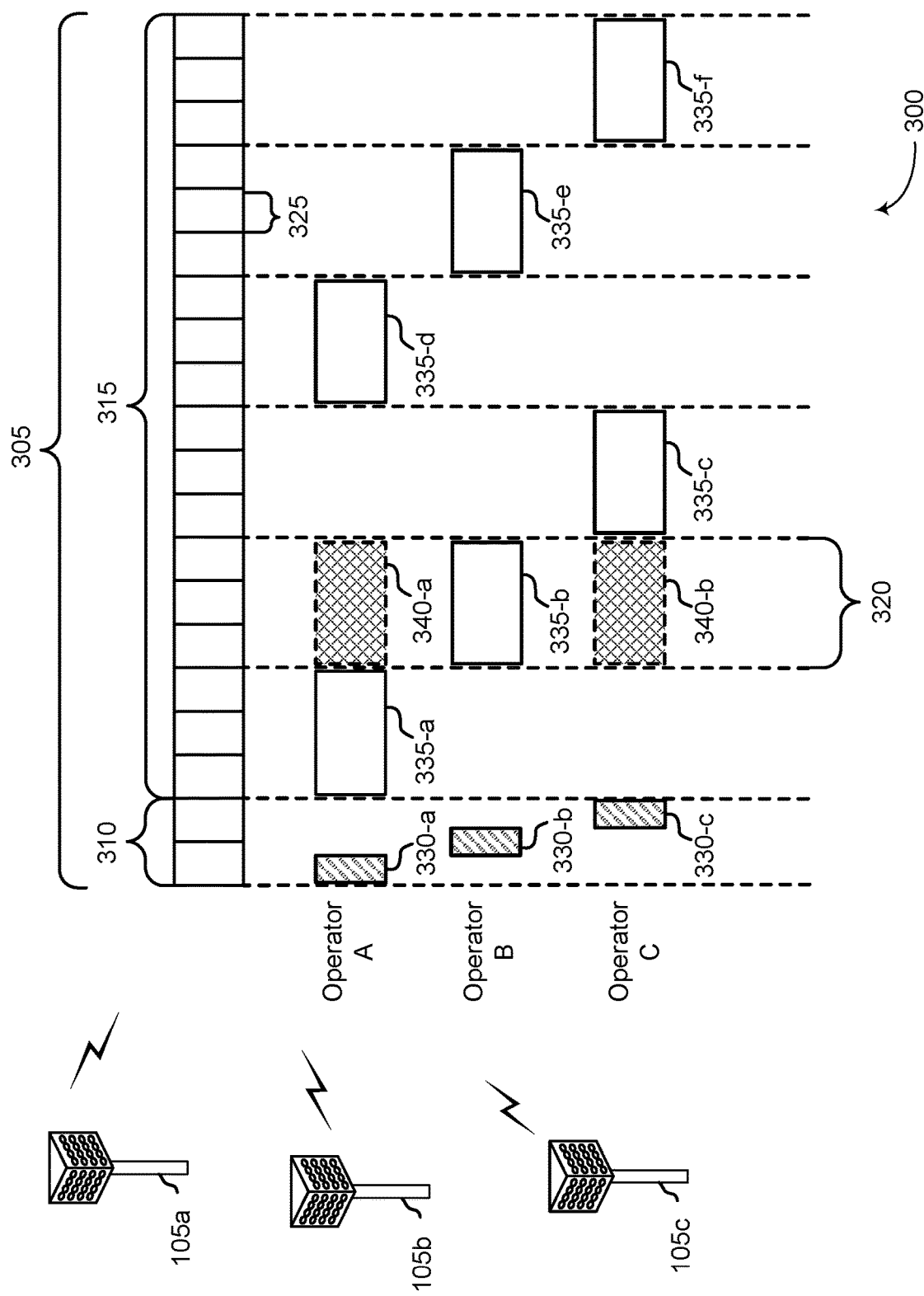
FIG. 3 is a block diagram illustrating an example of a wireless communication system including base stations that use directional wireless beams and that perform joint sensing operations in accordance with some aspects of the disclosure.

FIG. 3 illustrates an example of a timing diagram 300 for coordinated resource partitioning. The timing diagram 300 includes a superframe 305, which may represent a fixed duration of time (e.g., 20 ms). The superframe 305 may be repeated for a given communication session and may be used by a wireless system such as 5G network 100 described with reference to FIG. 1. The superframe 305 may be divided into intervals such as an acquisition interval (A-INT) 310 and an arbitration interval 315. As described in more detail below, the A-INT 310 and arbitration interval 315 may be subdivided into sub-intervals, designated for certain resource types, and allocated to different network operating entities to facilitate coordinated communications between the different network operating entities. For example, the arbitration interval 315 may be divided into a plurality of sub-intervals 320. Also, the superframe 305 may be further divided into a plurality of subframes 325 with a fixed duration (e.g., 1 ms). While timing diagram 300 illustrates three different network operating entities (e.g., Operator A, Operator B, Operator C), the number of network operating entities using the superframe 305 for coordinated communications may be greater than or fewer than the number illustrated in timing diagram 300.

The A-INT 310 may be a dedicated interval of the superframe 305 that is reserved for exclusive communications by the network operating entities. In some examples, each network operating entity may be allocated certain resources within the A-INT 310 for exclusive communications. For example, resources 330-a may be reserved for exclusive communications by Operator A, such as through base station 105a, resources 330-b may be reserved for exclusive communications by Operator B, such as through base station 105b, and resources 330-c may be reserved for exclusive communications by Operator C, such as through base station 105c. Since the resources 330-a are reserved for exclusive communications by Operator A, neither Operator B nor Operator C can communicate during resources 330-a, even if Operator A chooses not to communicate during those resources. That is, access to exclusive resources is limited to the designated network operator. Similar restrictions apply to resources 330-b for Operator B and resources 330-c for Operator C. The wireless nodes of Operator A (e.g., UEs 115 or base stations 105) may communicate any information desired during their exclusive resources 330-a, such as control information or data.

When communicating over an exclusive resource, a network operating entity does not need to perform any medium sensing procedures (e.g., listen-before-talk (LBT) or clear channel assessment (CCA)) because the network operating entity knows that the resources are reserved. Because only the designated network operating entity may communicate over exclusive resources, there may be a reduced likelihood of interfering communications as compared to relying on medium sensing techniques alone (e.g., no hidden node problem). In some examples, the A-INT 310 is used to transmit control information, such as synchronization signals (e.g., SYNC signals), system information (e.g., system information blocks (SIBs)), paging information (e.g., physical broadcast channel (PBCH) messages), or random access information (e.g., random access channel (RACH) signals).

In some examples, all of the wireless nodes associated with a network operating entity may transmit at the same time during their exclusive resources.

In some examples, resources may be classified as prioritized for certain network operating entities. Resources that are assigned with priority for a certain network operating entity may be referred to as a guaranteed interval (G-INT) for that network operating entity. The interval of resources used by the network operating entity during the G-INT may be referred to as a prioritized sub-interval. For example, resources 335-a may be prioritized for use by Operator A and may therefore be referred to as a G-INT for Operator A (e.g., G-INT-OpA). Similarly, resources 335-b may be prioritized for Operator B, (e.g., G-INT-OpB), resources 335-c (e.g., G-INT-OpC) may be prioritized for Operator C, resources 335-d may be prioritized for Operator A, resources 335-e may be prioritized for Operator B, and resources 335-f may be prioritized for Operator C.

The various G-INT resources illustrated in FIG. 3 appear to be staggered to illustrate their association with their respective network operating entities, but these resources may all be on the same frequency bandwidth. Thus, if viewed along a time-frequency grid, the G-INT resources may appear as a contiguous line within the superframe 305. This partitioning of data may be an example of time division multiplexing (TDM). Also, when resources appear in the same sub-interval (e.g., resources 340-a and resources 335-b), these resources represent the same time resources with respect to the superframe 305 (e.g., the resources occupy the same sub-interval 320), but the resources are separately designated to illustrate that the same time resources can be classified differently for different operators.

When resources are assigned with priority for a certain network operating entity (e.g., a G-INT), that network operating entity may communicate using those resources without having to wait or perform any medium sensing procedures (e.g., LBT or CCA). For example, the wireless nodes of Operator A are free to communicate any data or control information during resources 335-a without interference from the wireless nodes of Operator B or Operator C.

A network operating entity may additionally signal to another operator that it intends to use a particular G-INT. For example, referring to resources 335-a, Operator A may signal to Operator B and Operator C that it intends to use resources 335-a. Such signaling may be referred to as an activity indication. Moreover, since Operator A has priority over resources 335-a, Operator A may be considered as a higher priority operator than both Operator B and Operator C. However, as discussed above, Operator A does not have to send signaling to the other network operating entities to ensure interference-free transmission during resources 335-a because the resources 335-a are assigned with priority to Operator A.

Similarly, a network operating entity may signal to another network operating entity that it intends not to use a particular G-INT. This signaling may also be referred to as an activity indication. For example, referring to resources 335-b, Operator B may signal to Operator A and Operator C that it intends not to use the resources 335-b for communication, even though the resources are assigned with priority to Operator B. With reference to resources 335-b, Operator B may be considered a higher priority network operating entity than Operator A and Operator C. In such cases, Operators A and C may attempt to use resources of sub-interval 320 on an opportunistic basis. Thus, from the perspective of Operator A, the sub-interval 320 that contains resources 335-b may be considered an opportunistic interval (O-INT) for Operator A (e.g., O-INT-OpA). For illustrative purposes, resources 340-a may represent the O-INT for Operator A. Also, from the perspective of Operator C, the same sub-interval 320 may represent an O-INT for Operator C with corresponding resources 340-b. Resources 340-a, 335-b, and 340-b all represent the same time resources (e.g., a particular sub-interval 320), but are identified separately to signify that the same resources may be considered as a G-INT for some network operating entities and yet as an O-INT for others.

To utilize resources on an opportunistic basis, Operator A and Operator C may perform medium-sensing procedures to check for communications on a particular channel before transmitting data. For example, if Operator B decides not to use resources 335-b (e.g., G-INT-OpB), then Operator A may use those same resources (e.g., represented by resources 340-a) by first checking the channel for interference (e.g., LBT) and then transmitting data if the channel was determined to be clear. Similarly, if Operator C wanted to access resources on an opportunistic basis during sub-interval 320 (e.g., use an O-INT represented by resources 340-b) in response to an indication that Operator B was not going to use its G-INT (e.g., resources 335-b), Operator C may perform a medium sensing procedure and access the resources if available. In some cases, two operators (e.g., Operator A and Operator C) may attempt to access the same resources, in which case the operators may employ contention-based procedures to avoid interfering communications. The operators may also have sub-priorities assigned to them designed to determine which operator may gain access to resources if more than operator is attempting access simultaneously. For example, Operator A may have priority over Operator C during sub-interval 320 when Operator B is not using resources 335-b (e.g., G-INT-OpB). It is noted that in another sub-interval (not shown) Operator C may have priority over Operator A when Operator B is not using its G-INT.

In some examples, a network operating entity may intend not to use a particular G-INT assigned to it, but may not send out an activity indication that conveys the intent not to use the resources. In such cases, for a particular sub-interval 320, lower priority operating entities may be configured to monitor the channel to determine whether a higher priority operating entity is using the resources. If a lower priority operating entity determines through LBT or similar method that a higher priority operating entity is not going to use its G-INT resources, then the lower priority operating entities may attempt to access the resources on an opportunistic basis as described above.

In some examples, access to a G-INT or O-INT may be preceded by a reservation signal (e.g., request-to-send (RTS)/clear-to-send (CTS)), and the contention window (CW) may be randomly chosen between one and the total number of operating entities.

In some examples, an operating entity may employ or be compatible with coordinated multipoint (CoMP) communications. For example an operating entity may employ CoMP and dynamic time division duplex (TDD) in a G-INT and opportunistic CoMP in an O-INT as needed.

In the example illustrated in FIG. 3, each sub-interval 320 includes a G-INT for one of Operator A, B, or C. However, in some cases, one or more sub-intervals 320 may include resources that are neither reserved for exclusive use nor reserved for prioritized use (e.g., unassigned resources). Such unassigned resources may be considered an O-INT for any network operating entity, and may be accessed on an opportunistic basis as described above.

In some examples, each subframe 325 may contain 14 symbols (e.g., 250-μs for 60 kHz tone spacing). These subframes 325 may be standalone, self-contained Interval-Cs (ITCs) or the subframes 325 may be a part of a long ITC. An ITC may be a self-contained transmission starting with a downlink transmission and ending with an uplink transmission. In some embodiments, an ITC may contain one or more subframes 325 operating contiguously upon medium occupation. In some cases, there may be a maximum of eight network operators in an A-INT 310 (e.g., with duration of 2 ms) assuming a 250-μs transmission opportunity.

Although three operators are illustrated in FIG. 3, it should be understood that fewer or more network operating entities may be configured to operate in a coordinated manner as described above. In some cases, the location of the G-INT, O-INT, or A-INT within the superframe 305 for each operator is determined autonomously based on the number of network operating entities active in a system. For example, if there is only one network operating entity, each sub-interval 320 may be occupied by a G-INT for that single network operating entity, or the sub-intervals 320 may alternate between G-INTs for that network operating entity and O-INTs to allow other network operating entities to enter. If there are two network operating entities, the sub-intervals 320 may alternate between G-INTs for the first network operating entity and G-INTs for the second network operating entity. If there are three network operating entities, the G-INT and O-INTs for each network operating entity may be designed as illustrated in FIG. 3. If there are four network operating entities, the first four sub-intervals 320 may include consecutive G-INTs for the four network operating entities and the remaining two sub-intervals 320 may contain O-INTs. Similarly, if there are five network operating entities, the first five sub-intervals 320 may contain consecutive G-INTs for the five network operating entities and the remaining sub-interval 320 may contain an O-INT. If there are six network operating entities, all six sub-intervals 320 may include consecutive G-INTs for each network operating entity. It should be understood that these examples are for illustrative purposes only and that other autonomously determined interval allocations may be used.

It should be understood that the coordination framework described with reference to FIG. 3 is for illustration purposes only. For example, the duration of superframe 305 may be more or less than 20 ms. Also, the number, duration, and location of sub-intervals 320 and subframes 325 may differ from the configuration illustrated. Also, the types of resource designations (e.g., exclusive, prioritized, unassigned) may differ or include more or less sub-designations.

Figure 4A:
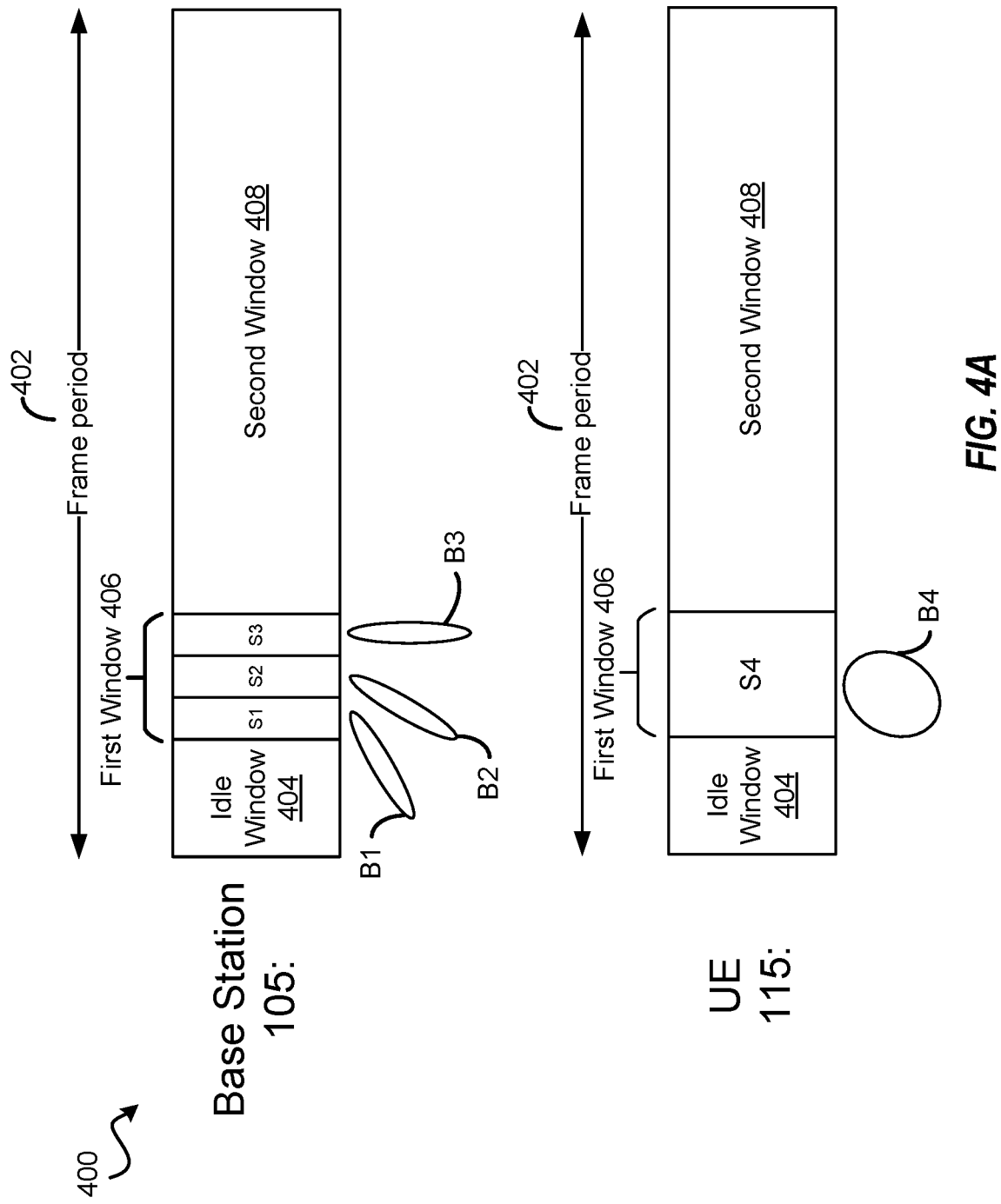
FIG. 4A is a diagram illustrating an example of a joint sensing operation performed by a base station and a UE in accordance with some aspects of the disclosure.

Referring to FIG. 4A, a first example of a first joint sensing operation for a mmWave system is depicted and generally designated 400. The joint sensing operation 400 of FIG. 4A may be performed using the base station 105 and the UE 115. In FIG. 4A, time advances from left to right.

In FIG. 4A, communications between the base station 105 and the UE 115 occur using frame periods, such as a frame period 402. Each frame period 402 may include a first window 406 (e.g., a contention period) and a second window 408 (e.g., a data transfer period) after the first window 406. In some implementations, each frame period 402 further includes an idle window 404 prior to the first window 406.

In some aspects of the disclosure, the joint sensing operation 400 includes a channel sensing operation (e.g., a frame-based equipment (FBE) listen-before-talk (LBT) operation) performed by the base station 105 during the first window 406 and further includes a channel sensing operation (e.g., an FBE LBT operation) performed by the UE 115 during the first window 406. To illustrate, a channel sensing operation may include scanning a medium (e.g., one or more channels) for signals and comparing an energy of the signals to a threshold energy value. If the energy fails to satisfy (e.g., is less than) the threshold energy value, then success of the channel sensing operation may be detected. If the energy satisfies (e.g., is greater than or equal to) the threshold energy value, then failure of the channel sensing operation may be detected.

Alternatively or in addition, a channel sensing operation may include scanning one or more channels for one or more types of signals, such as a blocking signal or a channel reservation signal. The channel sensing operation may succeed in response to failure to detect a blocking signal or a channel reservation signal. The channel sensing operation may fail in response to detecting a blocking signal or a channel reservation signal.

In some aspects, performing a channel sensing operation includes performing a direction-based scan. For example, the base station 105 may scan for one or more beams associated with a wireless communication network, such as beams B1, B2, and B3. As another example, the UE 115 may scan for one or more beams associated with the wireless communication network, such as a beam B4. In some examples, the beams B1-B4 correspond to signals transmitted by other devices (e.g., other base stations 105 or other UEs 115) of the wireless communication network or another wireless communication network. For example, the beams B1-B4 may include blocking messages or channel reservation messages, as illustrative examples. A direction-based scan may include scanning in some directions (but not all directions) or may include an omnidirectional scan in which scanning is performed in all directions (e.g., sequentially or simultaneously).

The base station 105 and the UE 115 may determine, based on the beams B1-B4, whether to communicate during the second window 408. For example, if the base station 105 fails to detect a beam reserving the second window 408, then the channel sensing operation performed by the base station 105 may succeed, and the base station 105 may initiate one or more communication operations with the UE 115 during the second window 408. As another example, if the UE 115 fails to detect a beam reserving the second window 408, then the channel sensing operation performed by the UE 115 may succeed, and the UE 115 may initiate one or more communication operations with the base station 105 during the second window 408. Alternatively, if the base station 105 (or the UE 115) detects one or more beams reserving the second window 408, then the channel sensing operation performed by the base station 105 (or by the UE 115) may fail. In this case, the base station 105 (or the UE 115) may avoid initiating communication during the second window 408.

In the example of FIG. 4A, the base station 105 performs a channel sensing operation during a plurality of time slots S1, S2, and S3 of the first window 406. In FIG. 4A, the UE 115 performs a channel sensing operation during each of the plurality of time slots (e.g., during a time slot B4 that corresponds to the time slots B1, B2, and B3). For example, the UE 115 may scan for an entire duration of the time slots S1, S2, and S3.

Figure 4B:
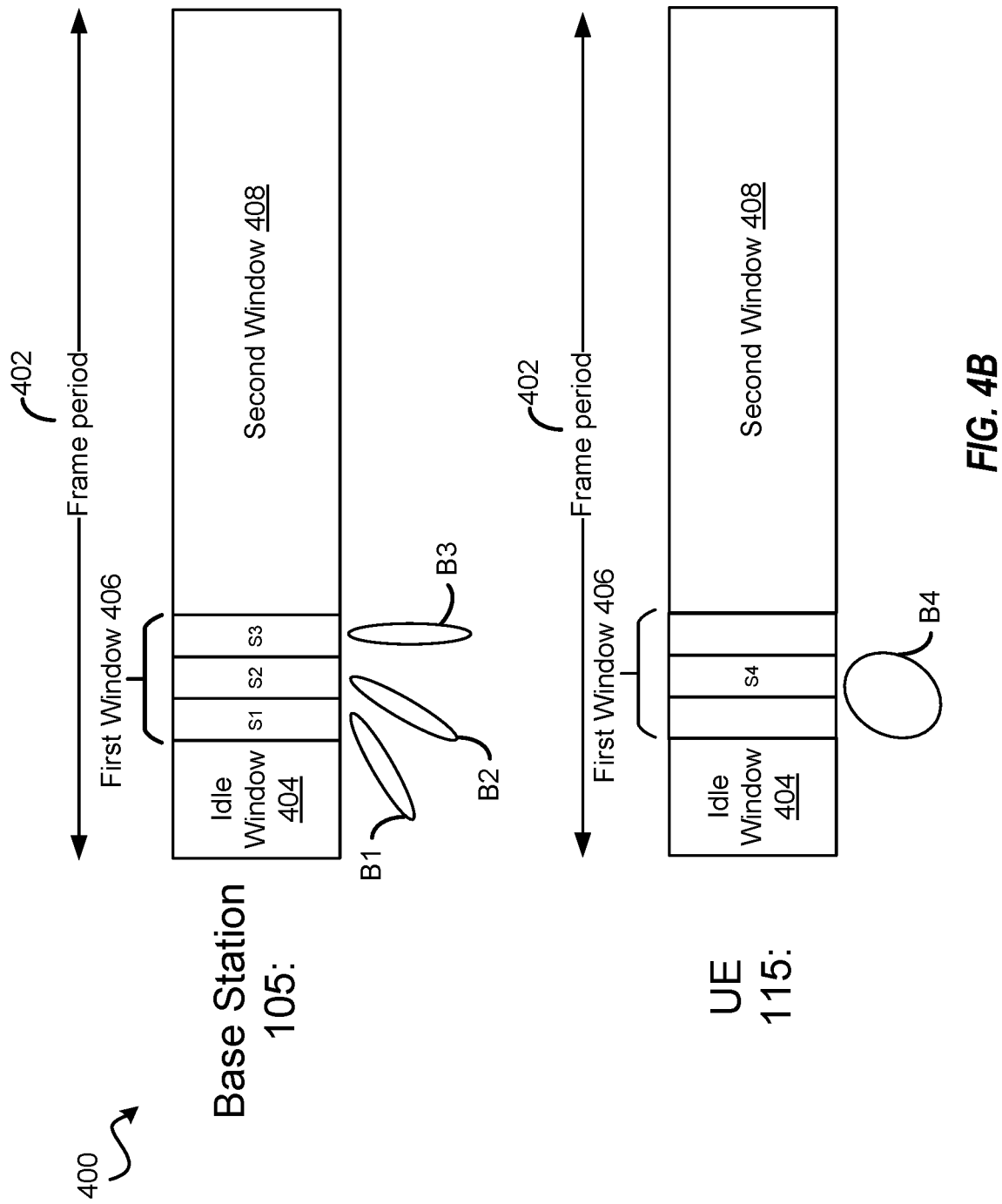
FIG. 4B is another diagram illustrating an example of a joint sensing operation performed by a base station and a UE in accordance with some aspects of the disclosure.

FIG. 4B depicts another example of the joint sensing operation 400 in accordance with aspects of the disclosure. In FIG. 4B, the base station 105 performs a channel sensing operation during the plurality of time slots S1, S2, and S3 of the first window 406, and the UE 115 performs a channel sensing operation during one of the plurality of time slots S1, S2, and S3. To illustrate, in the example of FIG. 4B, the time slot S4 occurs during the time slot S2 (but not during the time slots S1 and S3).

In some examples, the base station 105 is configured to select, on behalf of the UE 115, a portion (e.g., subset) of the first window 406 during which the UE 115 is to perform a channel sensing operation. To illustrate, in the example depicted in FIG. 4B, the base station 105 may indicate to the UE 115 that the UE 115 is to perform a channel sensing operation during the time slot S4. In other examples, the UE 115 is configured to select a portion (e.g., subset) of the first window 406 during which the UE 115 performs a channel sensing operation, such as by selecting the time slot S4 randomly, pseudo-randomly, or deterministically.

Figure 4C:
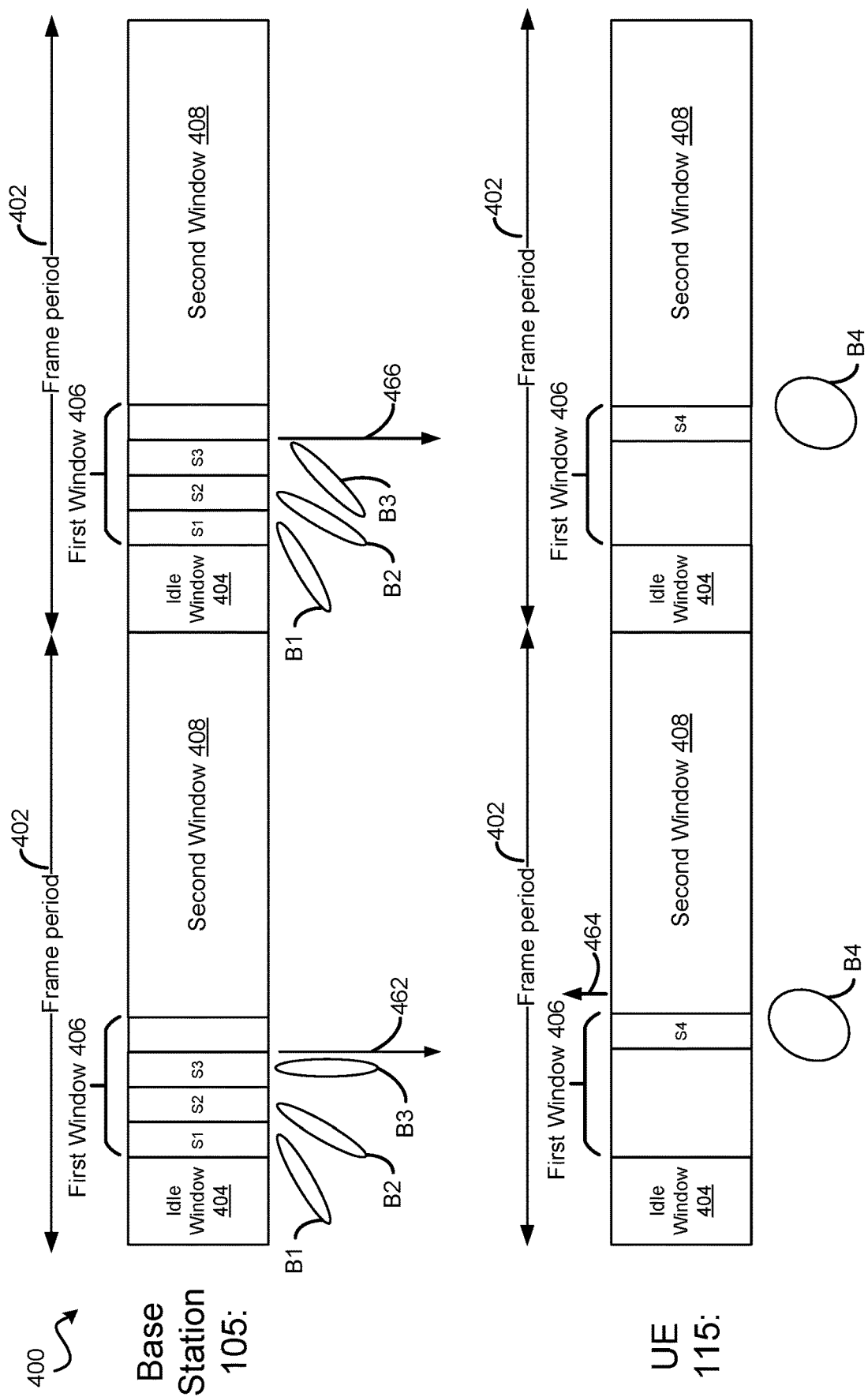
FIG. 4C is another diagram illustrating an example of a joint sensing operation performed by a base station and a UE in accordance with some aspects of the disclosure.

FIG. 4C depicts an additional example of the joint sensing operation 400 in accordance with aspects of the disclosure. In FIG. 4C, the base station 105 performs a channel sensing operation during the plurality of time slots S1, S2, and S3 of the first window 406, and the UE 115 performs a channel sensing operation after the plurality of time slots (e.g., during the first window 406 or during the second window 408). For example, the UE 115 may perform the channel sensing operation conditionally based on success of the channel sensing operation performed by the base station 105. Alternatively, the UE 115 may avoid (or defer) performing the channel sensing operation based on failure of the channel sensing operation performed by the base station 105.

To further illustrate, in the example of FIG. 4C, the base station 105 may be configured to detect success of a channel sensing operation performed by the base station 105 and to send an indication 462 of the success to the UE 115. The UE 115 may be configured to perform a channel sensing operation in response to receiving the indication 462. Further, in FIG. 4C, the UE 115 may be configured to send, to the base station 105, a message 464 indicating a result of a channel sensing operation performed by the UE 115.

In other cases, the base station 105 may detect failure of the channel sensing operation performed by the base station 105. As an illustrative example, in FIG. 4C, direction of the beam B3 may change from one frame period 402 to another frame period 402. In this case, if base station 105 detects that the change of direction may cause the beam B3 to interfere with communications between the base station 105 and the UE 115, the base station 105 may detect failure of the channel sensing operation. The base station 105 may send, to the UE 115, an indication 466 of failure of the channel sensing operation performed by the base station 105. The UE 115 may avoid (or defer) performing a channel sensing operation in response to receiving the indication 466.

In some implementations, the example of FIG. 4C may be associated with increased overhead as compared to the examples of FIGS. 4A and 4B (e.g., due to lag associated with transmitting, receiving, and processing the indications 462 and 466). In some wireless networks, the example of FIG. 4C may avoid collisions between transmission by multiple UEs 115, which may be advantageous (despite increased overhead) in situations with a relatively large number of UEs 115 in a particular cell or area.

The examples depicted in FIGS. 4A, 4B, and 4C are illustrative and are not intended to limit the scope of the disclosure. For example, although three time slots S1, S2, and S3 and three beams B1, B2, and B3 are depicted for illustration, in other examples, the base station 105 may sense a different number of beams, may use a different number of time slots, or both (e.g., by sensing one beam during multiple time slots, as an illustrative example). Other modifications and examples are also within the scope of the disclosure.

One or more aspects of FIGS. 4A, 4B, and 4C may lower power consumption or improve efficiency in a wireless communication system. For example, by performing a joint sensing operation 400 that utilizes channel sensing operations performed by both the base station 105 and the UE 115, network measurements may be less localized and more robust. As a result, communications may be coordinated across multiple devices (e.g., instead of by a single device), resulting in better throughput and improved rate prediction in some cases.

Figure 5:
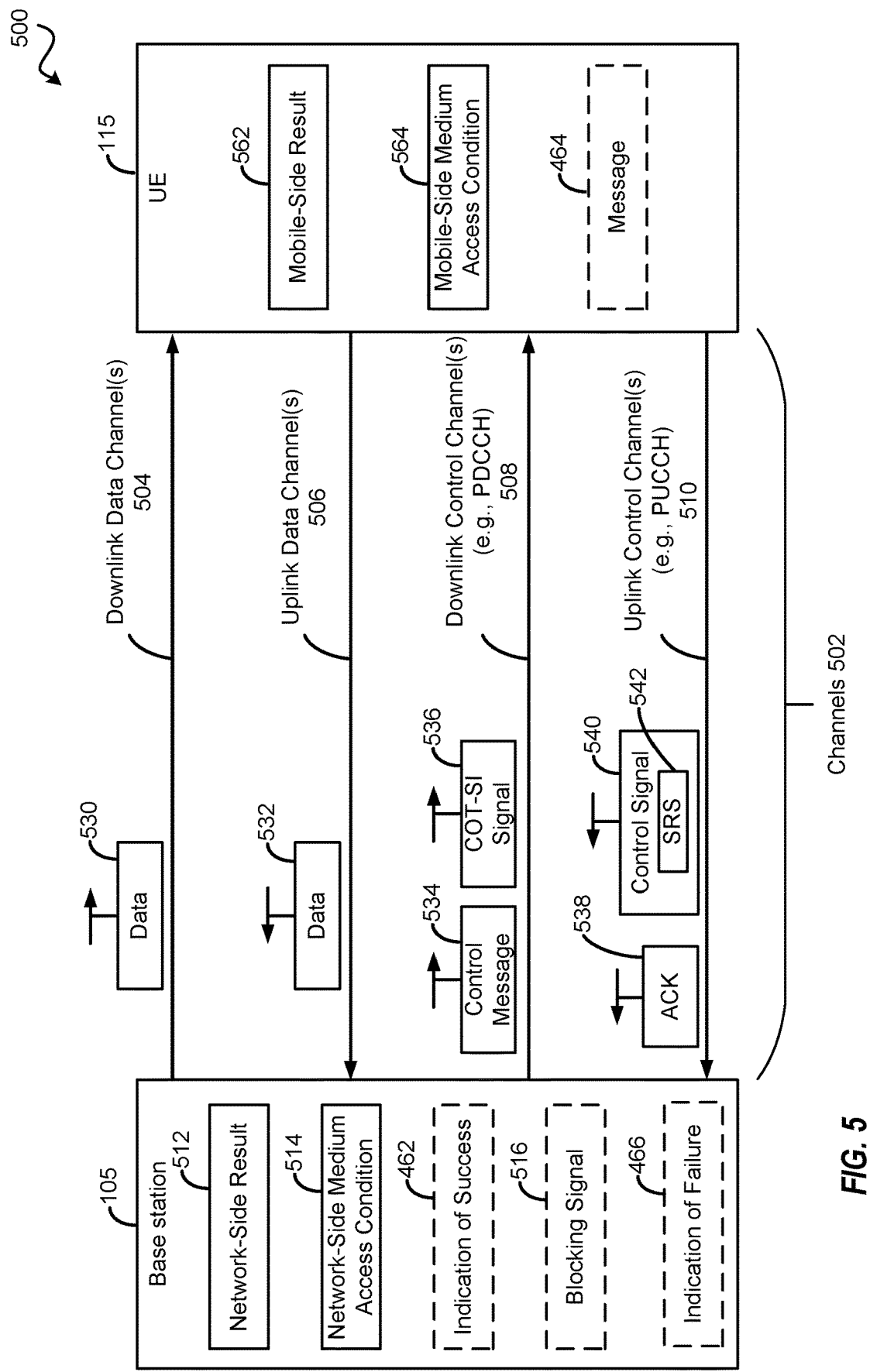
FIG. 5 is a diagram illustrating an example of a wireless communication system configured to perform joint sensing operations in accordance with some aspects of the disclosure.

Referring to FIG. 5, a particular illustrative example of a wireless communication system to perform joint sensing operations is depicted and generally designated 500. The wireless communication system 500 may be configured to operate in accordance with the joint sensing operation 400 of any of FIGS. 4A, 4B, and 4C. The wireless communication system 500 may include the base station 105 and the UE 115. Although a single base station 105 and a single UE 115 are shown in FIG. 5 for illustration, the wireless communication system 500 may include a different number of base stations 105, a different number of UEs 115, or a combination thereof.

In FIG. 5, the base station 105 and the UE 115 communicate using channels 502 of the wireless communication system 500. In some examples, the wireless communication system 500 includes one or more of a sub-7 gigahertz (GHz) wireless communication network, a fourth-generation unlicensed long-term evolution (4G LTE-U) wireless communication network, or a fifth-generation new radio unlicensed (5G NR-U) wireless communication network. The channels 502 may include one or more downlink data channels 504, one or more uplink data channels 506, one or more downlink control channels 508, one or more uplink control channels 510, or a combination thereof. In an illustrative example, the one or more downlink control channels 508 include a physical downlink control channel (PDCCH). In some examples, the one or more uplink control channels 510 include a physical uplink control channel (PUCCH).

During operation, the base station 105 and the UE 115 may perform one or more joint sensing operations, such as the joint sensing operation 400 of any of FIGS. 4A, 4B, and 4C. For example, the base station 105 may perform a channel sensing operation to determine a network-side result 512. The network-side result 512 may indicate either detection of a network-side medium access condition 514 or failure to detect the network-side medium access condition 514. In one example, detection of the network-side medium access condition 514 includes detecting that an amount of energy of received signals (e.g., signals received via the one or more downlink data channels 504) fails to satisfy a threshold energy value. Alternatively or in addition, detection of the network-side medium access condition 514 may include failing to receive one or more types of signals, such as a blocking signal or a channel reservation message. Thus, the channel sensing operation performed by the base station 105 may either succeed in response to detection of the network-side medium access condition 514 or fail in response to failure to detect the network-side medium access condition 514.

The UE 115 may perform a channel sensing operation to determine a mobile-side result 562. The mobile-side result 562 may indicate either detection of a mobile-side medium access condition 564 or failure to detect the mobile-side medium access condition 564. In one example, detection of the mobile-side medium access condition 564 includes detecting that an amount of energy of received signals (e.g., signals received via the one or more uplink data channels 506) fails to satisfy a threshold energy value. Alternatively or in addition, detection of the mobile-side medium access condition 564 may include failing to receive one or more types of signals, such as a blocking signal or a channel reservation message. Thus, the channel sensing operation performed by the UE 115 may either succeed in response to detection of the mobile-side medium access condition 564 or fail in response to failure to detect the mobile-side medium access condition 564.

In one example, a joint sensing operation is performed to determine whether the base station 105 (but not the UE 115) is eligible transmit data to the UE 115 during the second window 408. In this case, the UE 115 may be referred to as "passive" (since for example the UE 115 may refrain from transmitting data during the second window 408). In some implementations, a "passive UE" technique may be conservative (e.g., by avoiding transmissions by the UE 115 that may cause or be subject to interference). To illustrate, Table 1 indicates certain examples that may be performed in connection with a "passive" UE 115.

TABLE 1

| Example | Conditions | Operation |
| --- | --- | --- |
| 1 | Base station and UE both fail to detect medium access conditions | Skip the frame |
| 2 | Base station fails to detect medium access condition, and UE detects medium access condition | UE does not transmit in the frame. No downlink transmission is received by UE from base station |
| 3 | Base station detects medium access condition, and UE fails to detect medium access condition | UE does not respond to a transmission from the base station and skips ACK/PUCCH. Frame is not utilized |
| 4 | Base station and UE both detect medium access conditions, and UE detects COT-SI | UE responds with a ACK/PUCCH to receive data in the frame |
| 5 | Base station and UE both detect medium access conditions, and UE fails to detect COT-SI | No response from the UE |

In Example 1, the network-side result 512 indicates failure of the base station 105 to detect the network-side medium access condition 514 during a particular frame period 402, and the mobile-side result 562 indicates failure of the UE 115 to detect the mobile-side medium access condition 564 during the particular frame period 402. In this case, both the base station 105 and the UE 115 may determine to avoid communication during the particular frame period 402 (e.g., the particular frame period 402 may be "skipped").

In Example 2, the network-side result 512 indicates failure of the base station 105 to detect the network-side medium access condition 514 during a particular frame period 402, and the mobile-side result 562 indicates detection by the UE 115 of the mobile-side medium access condition 564 during the particular frame period 402. In this case, the base station 105 may determine to avoid communication with the UE 115 during the particular frame period 402 (e.g., due to noise or interference associated with one or more channels, such as the one or more downlink data channels 504). Consequently, the UE 115 may fail to receive communications from the base station 105 during the particular frame period 402 and may determine to avoid communication with the base station 105 during the particular frame period 402 as a result.

In Example 3, the network-side result 512 indicates detection by the base station 105 of the network-side medium access condition 514 during a particular frame period 402, and the mobile-side result 562 indicates failure of the UE 115 to detect the mobile-side medium access condition 564 during the particular frame period 402. In this case, the UE 115 may receive from the base station 105 a control message 534 during the particular frame period 402. The control message 534 may indicate a request to schedule data communication to the UE 115 using the one or more downlink data channels 504 during the second window 408 of the particular frame period 402. In Example 3, the UE 115 may decline to send to the base station 105 an acknowledgement (ACK) 538 of the control message 534. As a result, no data communication may occur during the second window 408 of the particular frame period 402.

In Example 4, the network-side result 512 indicates detection by the base station 105 of the network-side medium access condition 514 during a particular frame period 402, and the mobile-side result 562 indicates detection by the UE 115 of the mobile-side medium access condition 564 during the particular frame period 402. Further, in Example 4, the UE 115 receives a channel occupancy time system information (COT-SI) signal 536 from the base station 105 during the particular frame period 402. In some examples, the COT-SI signal 536 indicates an upcoming transmission by the base station 105 to the UE 115.

In this case, the UE 115 may receive the control message 534 from the base station 105 and may send the ACK 538 of the control message 534 to the base station 105 in response to receiving the COT-SI signal 536. In response to receiving the ACK 538, the base station 105 may send data 530 to the UE 115 (e.g., using the one or more downlink data channels 504) during the second window 408 of the particular frame period 402.

In Example 5, the network-side result 512 indicates detection by the base station 105 of the network-side medium access condition 514 during a particular frame period 402, and the mobile-side result 562 indicates detection by the UE 115 of the mobile-side medium access condition 564 during the particular frame period 402. Further, in Example 5, the UE 115 fails to receive the COT-SI signal 536 from the base station 105 during the particular frame period 402. To illustrate, in one example, noise or interference may prevent the UE 115 from receiving the COT-SI signal 536. In another example, the base station 105 may avoid sending the COT-SI signal 536 to the UE 115 during the particular frame period 402 if no data is ready for transmission to the UE 115.

In this case, the UE 115 may receive the control message 534 from the base station 105 and may decline to send to the base station 105 the ACK 538 of the control message 534. As a result, no data communication may occur during the second window 408 of the particular frame period 402.

Thus, in the examples of Table 1, channel sensing operations may be performed jointly by the base station 105 and the UE 115. In some cases, the base station 105 may "implicitly" decline to send the data 530 to the UE 115 during a particular frame period 402 in response to failure of a channel sensing operation performed by the base station 105 (e.g., by declining to send the control message 534 to the UE 115). Further, in some cases, the UE 115 may "implicitly" decline to receive the data 530 from the base station 105 during a particular frame period 402 in response to failure of a channel sensing operation performed by the UE 115 (e.g., by declining to send the ACK 538 to the base station 105.

In some examples, a joint sensing operation is performed to determine whether both the base station 105 and the UE 115 are eligible to transmit data during the second window 408 of a particular frame period 402. In this case, the UE 115 may be referred to as "active" (since for example the UE 115 may be eligible to transmit data during the second window 408 of the particular frame period 402). In some implementations, an "active UE" technique may increase throughput (by enabling transmissions by both the base station 105 and the UE 115) but may be subject to increased interference as compared to a passive UE technique in some cases. To illustrate, Table 2 indicates certain examples that may be performed in connection with an "active" UE 115.

TABLE 2

| Example | Conditions | Operation |
|---|---|---|
| 6 | Base station and UE both fail to detect medium access conditions | Skip the frame |
| 7 | Base station fails to detect medium access condition, and UE detects medium access condition; or Base station detects medium access condition, and UE fails to detect COT-SI | UE transmits a PUCCH/SRS even without detection of a COT-SI. The UE is ok to receive DL traffic but should not transmit any UL traffic. Base station can transmit to the UE as long as it does not explicitly receive a blocking signal to stop DL transmission Exception: ACK/CSI reports/SRS etc. |
| 8 | Base station detects channel access condition, and UE fails to detect channel access condition | UE receives a COT-SI from the base station and responds back with a short-ACK message indicating LBT failed. The UE is ok to transmit UL traffic as long as it did not receive an explicit message to stop UL transmission, but should not receive any DL traffic. Exception: PDCCH |
| 9 | Base station and UE both detect channel access conditions, and UE detects COT-SI | UE responds with a ACK to receive data in the frame |

In Example 6, the network-side result 512 indicates failure of the base station 105 to detect the network-side medium access condition 514 during a particular frame period 402, and the mobile-side result 562 indicates failure of the UE 115 to detect the mobile-side medium access condition 564 during the particular frame period 402. In this case, both the base station 105 and the UE 115 may determine to avoid communication during the particular frame period 402 (e.g., the particular frame period 402 may be "skipped").

In Example 7, the network-side result 512 indicates failure of the base station 105 to detect the network-side medium access condition 514 during a particular frame period 402, and the mobile-side result 562 indicates detection by the UE 115 of the mobile-side medium access condition 564 during the particular frame period 402. Alternatively, in another scenario, the network-side result 512 indicates detection by the base station 105 of the network-side medium access condition 514 during a particular frame period 402, and the UE 115 fails to receive the COT-SI signal 536 during the particular frame period 402.

In accordance with Example 7, the UE 115 may receive data via the one or more downlink data channels 504 and may avoid sending data using the one or more uplink data channels 506. For example, the UE 115 may send a control signal 540 to the base station 105 using the one or more uplink control channels 510 during the second window 408 of the particular frame period 402 and may avoid sending a data signal to the base station 105 during the second window 408 of the particular frame period 402. The UE 115 may receive, from the base station 105, the data 530 in response to failure of the base station to detect one or more blocking signals (e.g., a blocking signal 516 from another base station 105, from another UE 115, or from another device) during the particular frame period 402. In some examples, the control signal 540 includes a sounding reference signal (SRS) 542 transmitted via a physical uplink control channel (PUCCH) of the one or more uplink control channels 510. In other examples, the control signal 540 may include another signal, such as an ACK or a channel state information (CSI) report, as illustrative examples.

In Example 8, the network-side result 512 indicates detection by the base station 105 of the network-side medium access condition 514 during a particular frame period 402, and the mobile-side result 562 indicates failure of the UE 115 to detect the mobile-side medium access condition 564 during the particular frame period 402.

In this case, the UE 115 may receive the COT-SI signal 536 from the base station 105 during the particular frame period 402. In response to receiving the COT-SI signal 536, the UE 115 may send, to the base station 105, an indication of failure of the channel sensing operation performed by the UE 115. For example, the indication may include the message 464 indicating failure to detect the mobile-side medium access condition 564. In another example, the indication is included in an ACK message or a non-acknowledgement (NACK) message. Upon receiving the indication, the base station 105 may avoid sending data to the UE 115 during the particular frame period 402. Thus, in Example, 8, the UE 115 may avoid receiving data from the base station 105 during the second window 408 of the particular frame period 402 (e.g., due to failure to detect the mobile-side medium access condition 564).

In some cases, the UE 115 may send data to the base station 105 during the particular frame period 402. For example, the UE 115 may send data 532 to the base station 105 via the one or more uplink data channels 506 during the particular frame period 402. In some implementations, sending of the data 532 is conditioned upon one or more messages from the base station 105. In one example, the base station 105 may decline to receive the data 532 by sending a "stop" message to the UE 115 (e.g., in response to receiving a blocking signal 516). In this case, the UE 115 may avoid sending the data 532 to the base station 105 during the particular frame period 402. Alternatively, the UE 115 may send the data 532 to the base station 105 in response to failure of the base station 105 to detect a blocking signal 516.

In Example 9, the network-side result 512 indicates detection by the base station 105 of the network-side medium access condition 514 during a particular frame period 402, and the mobile-side result 562 detection by the UE 115 of the mobile-side medium access condition 564 during the particular frame period 402. Further, in Example 9, the UE 115 receives the COT-SI signal 536 from the base station 105 during the particular frame period 402.

In this example, the UE 115 may send the ACK 538 to the base station 105 (e.g., to acknowledge reception of the COT-SI signal 536). In response to the ACK 538, the base station 105 may send data (e.g., the data 530) to the UE 115 during the second window 408 of the particular frame period 402. The UE 115 may receive the data 530 from the base station 105 in response to sending the ACK 538.

In some aspects of the disclosure, one or more communication techniques described herein are specified by a communication protocol used by the base station 105 and the UE 115. For example, the communication protocol may specify whether the base station 105 and the UE 115 are to operate in accordance with the examples of Table 1 or in accordance with the examples of Table 2. In some implementations, the base station 105 may configure (e.g., set or change) a communication technique described herein. For example, the base station may provide a message to the UE 115 indicating whether to operate in accordance with the examples of Table 1 or in accordance with the examples of Table 2. The message may include a radio resource control (RRC) configuration message, a downlink control information (DCI) configuration message, or a medium access control (MAC) control element (CE), as illustrative examples.

Although certain examples are described separately for convenience, it is noted that a single communication session can include multiple examples described herein. For example, a single communication session between the base station 105 and the UE 115 may include operations corresponding to multiple examples of Tables 1 and 2.

One or more aspects of FIG. 5 may lower power consumption or improve efficiency in a wireless communication system 500. For example, by performing a joint sensing operation that utilizes sensing operations performed by both the base station 105 and the UE 115, network measurements may be less localized and more robust. As a result, communications may be coordinated across multiple devices (instead of by a single device), resulting in better throughput and improved rate prediction in some cases.

As an additional benefit, in some mmWave communication systems, the probability of detecting interference for a particular beam may be relatively low (since for example, the probability of interference propagating in a particular direction that matches the beam may be relatively low). In this case, instances of unacknowledged messages (e.g., where the base station 105 transmits a message in response to detecting that a network medium is idle, and where the UE 115 declines to acknowledge the message in response to detecting that the network medium is busy) may be relatively infrequent. As a result, communication efficiency is increased in a mmWave communication system that uses a joint sensing technique in accordance with aspects of the disclosure.

Figure 6:
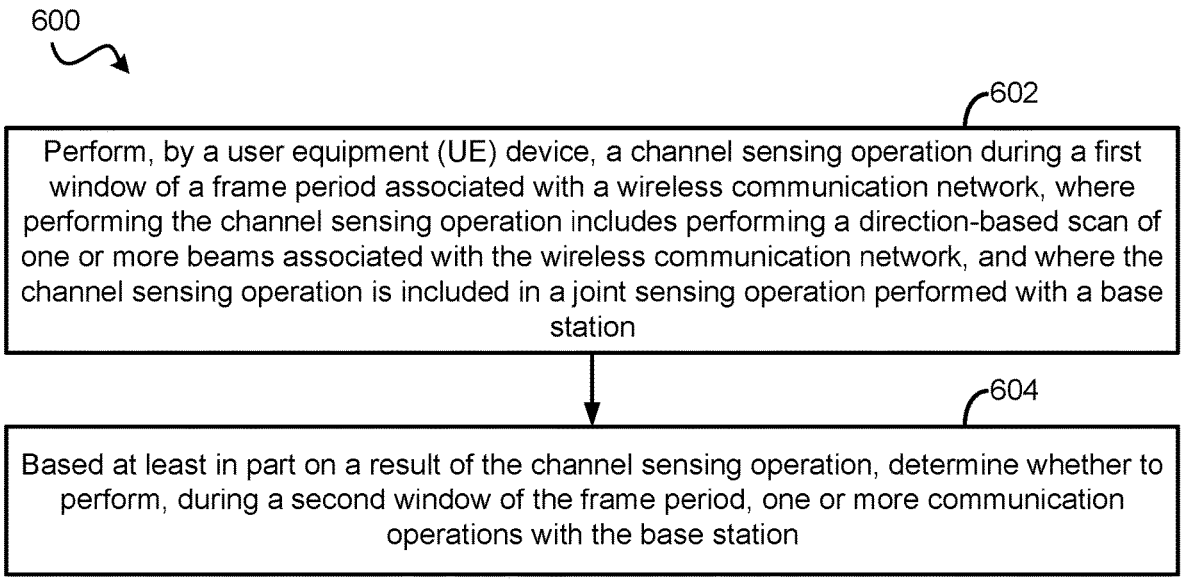
FIG. 6 is a flow chart illustrating an example of a method of wireless communication in accordance with some aspects of the disclosure.

Referring to FIG. 6, an example of a method of wireless communication is depicted and generally designated 600. In one example, operations of the method 600 are performed by the UE 115.

The method 600 includes performing, by a UE device, a channel sensing operation during a first window of a frame period associated with a wireless communication network, at 602. Performing the channel sensing operation includes performing a direction-based scan of one or more beams associated with the wireless communication network. To illustrate, the UE 115 may scan for the beam B4 during the first window 406 of the frame period 402. The channel sensing operation is included in a joint sensing operation performed with a base station (e.g., the joint sensing operation 400 performed with the base station 105). During the joint sensing operation, a second sensing operation may be performed by the base station 105 to determine a second result (e.g., the network-side result 512).

The method 600 further includes determining, based at least in part on a result of the channel sensing operation, whether to perform, during a second window of the frame period, one or more communication operations with a base station, at 604. For example, the UE 115 may determine, based at least in part on the mobile-side result 562, whether to communicate with the base station 105 during the second window 408 of the frame period 402. In some implementations, communicating with the base station 105 is performed according to any example described with reference to Tables 1 and 2.

Figure 7:
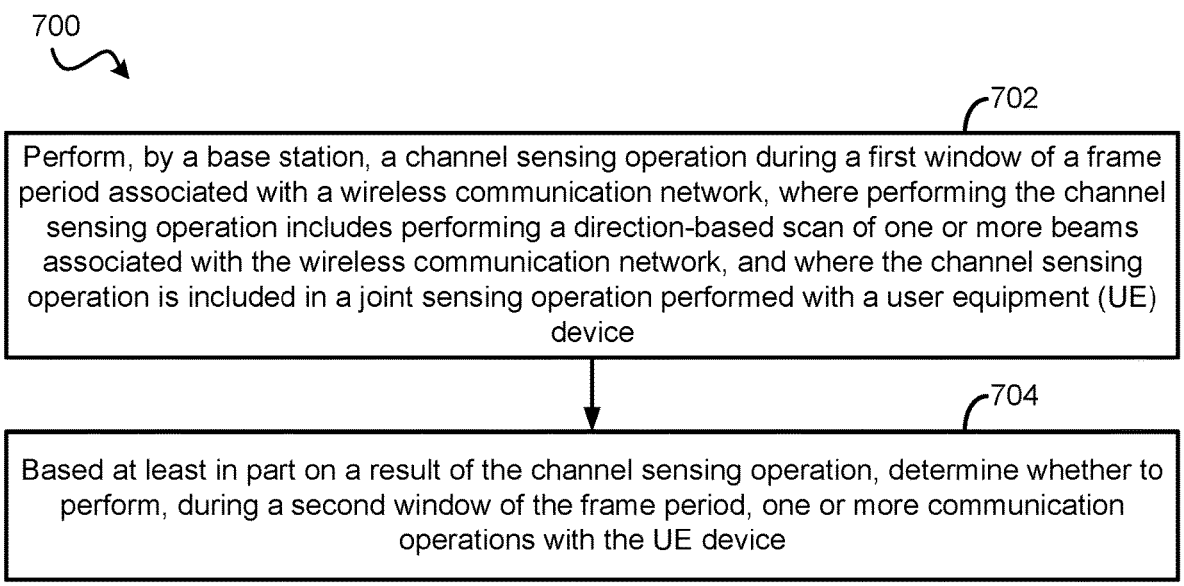
FIG. 7 is a flow chart illustrating an example of a method of wireless communication in accordance with some aspects of the disclosure.

Referring to FIG. 7, an example of a method of wireless communication is depicted and generally designated 700. In one example, operations of the method 700 are performed by the base station 105.

The method 700 includes performing, by a base station, a channel sensing operation during a first window of a frame period associated with a wireless communication network, at 702. Performing the channel sensing operation includes performing a direction-based scan of one or more beams associated with the wireless communication network. To illustrate, the base station 105 may scan for the beams B1, B2, and B3 during the first window 406 of the frame period 402. The channel sensing operation is included in a joint sensing operation performed with a UE device (e.g., the joint sensing operation 400 performed with the UE 115). During the joint sensing operation, a second sensing operation may be performed by the UE 115 to determine a second result (e.g., the mobile-side result 562).

The method 700 further includes determining, based at least in part on a result of the channel sensing operation, whether to perform, during a second window of the frame period, one or more communication operations with a UE device, at 704. For example, the base station 105 may determine, based at least in part on the network-side result 512, whether to communicate with the UE 115 during the second window 408 of the frame period 402. In some implementations, communicating with the UE 115 is performed according to any example described with reference to Tables 1 and 2.

Figure 8:
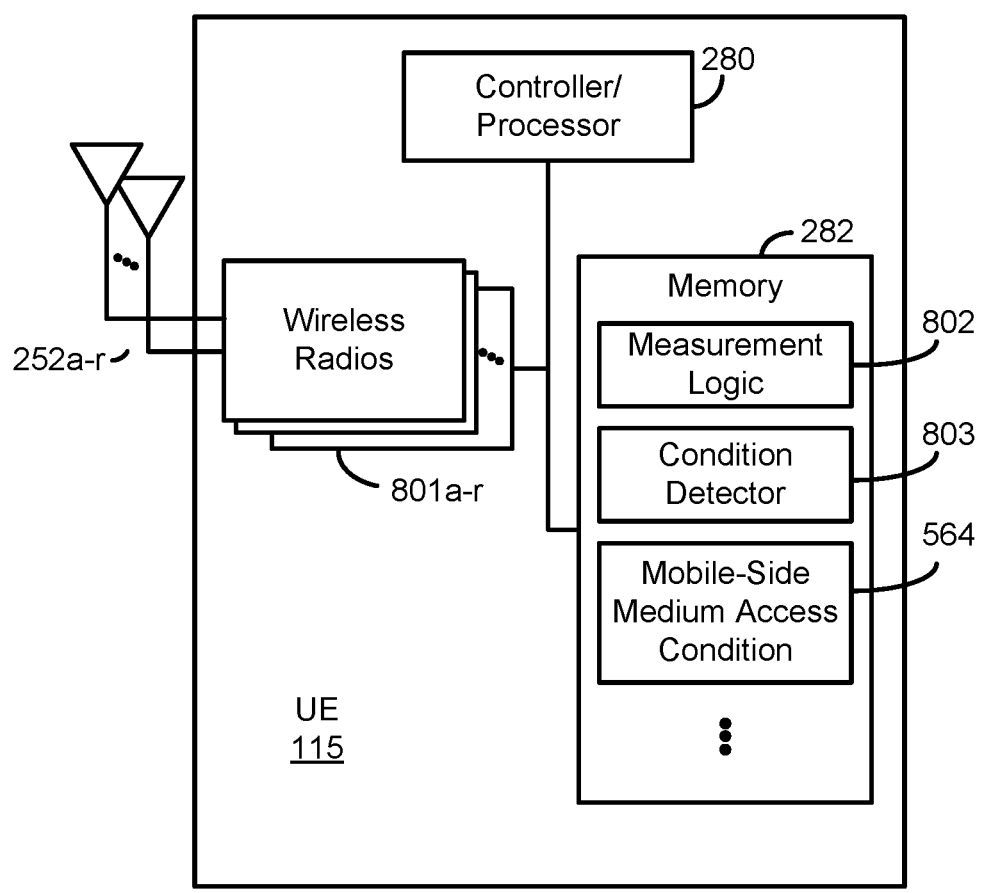
FIG. 8 is a block diagram illustrating an example of a UE configured to perform channel sensing of a joint sensing operation according to some aspects of the present disclosure.

FIG. 8 is a block diagram illustrating UE 115 configured according to one aspect of the present disclosure. UE 115 includes the structure, hardware, and components as illustrated for UE 115 of FIG. 2. For example, UE 115 includes controller/processor 280, which operates to execute logic or computer instructions stored in memory 282, as well as controlling the components of UE 115 that provide the features and functionality of UE 115. UE 115, under control of controller/processor 280, transmits and receives signals via wireless radios 801a-r and antennas 252a-r. Wireless radios 801a-r include various components and hardware, as illustrated in FIG. 2 for UE 115, including modulator/demodulators 254a-r, MIMO detector 256, receive processor 258, transmit processor 264, and TX MIMO processor 266.

Memory 282 is configured to store instructions, data, or other information that enables joint sensing operations performed by the UE 115 and the base station 105. For example, memory 282 may store measurement logic 802 executable by controller/processor 280 to perform one or more network measurements using one or more operations described herein. As a particular example, the measurement logic 802 may be executable by controller/processor 280 to determine an amount of energy associated with one or more received signals, such as the beam B4. Alternatively or in addition, the measurement logic 802 may be executable by controller/processor 280 to determine whether a blocking signal or a channel reservation message is detected.

FIG. 8 also illustrates that memory 282 is configured to store a condition detector 803. The condition detector 803 may be executable by the controller/processor 280 to determine whether the mobile-side medium access condition 564 is detected (or satisfied). For example, the condition detector 803 may be executable by the controller/processor 280 to compare an amount of energy of the beam B4 to a threshold amount of energy to determine whether the mobile-side medium access condition 564 is detected (or satisfied). Alternatively or in addition, the condition detector 803 may be executable by the controller/processor 280 to determine whether a blocking signal or a channel reservation message indicates a conflict with a transmission to be performed by the UE 115, with a transmission to be performed by the base station 105, or both. The condition detector 803 may be executable by the controller/processor 280 to output a signal having either a first value (e.g., a logic "0" value or a logic "1" value) indicating failure to detect the mobile-side medium access condition 564 or a second value (e.g., a logic "1" value or a logic "0" value indicating detection of the mobile-side medium access condition 564.

Figure 9:
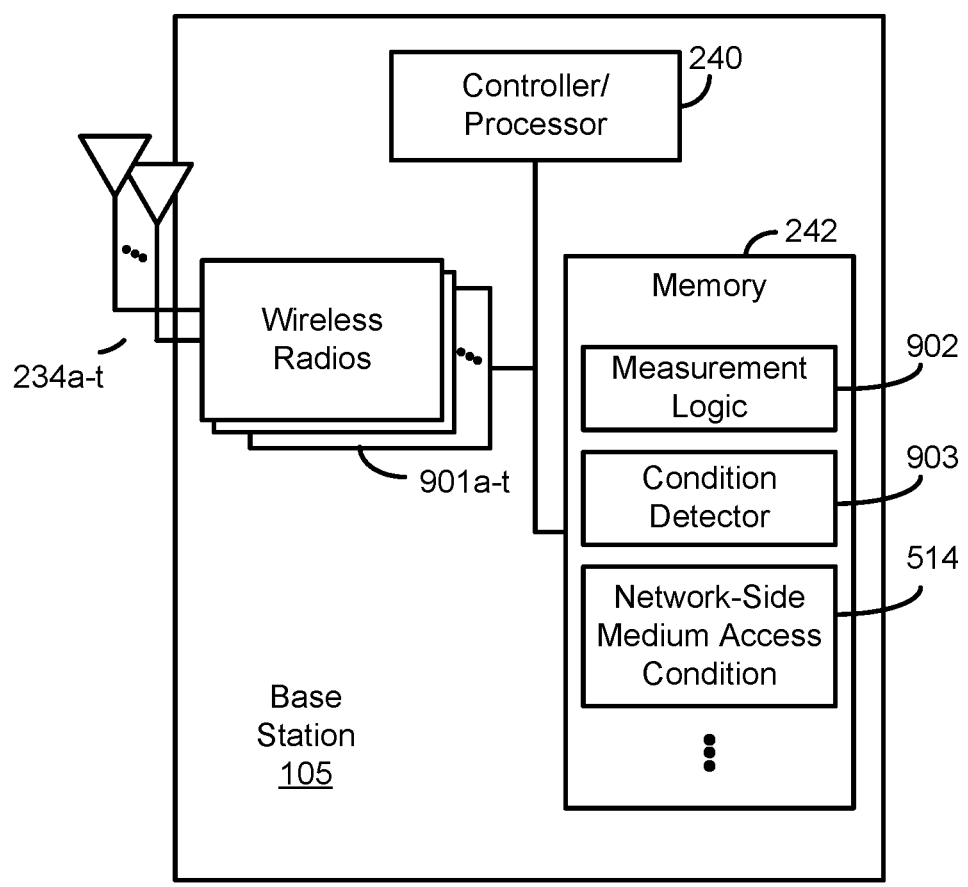
FIG. 9 is a block diagram illustrating an example of a base station configured to perform channel sensing of a joint sensing operation according to some aspects of the present disclosure.

FIG. 9 is a block diagram illustrating base station 105 configured according to one aspect of the present disclosure. Base station 105 includes the structure, hardware, and components as illustrated for base station 105 of FIG. 2. For example, base station 105 includes controller/processor 240, which operates to execute logic or computer instructions stored in memory 242, as well as controlling the components of base station 105 that provide the features and functionality of base station 105. Base station 105, under control of controller/processor 240, transmits and receives signals via wireless radios 901*a-t* and antennas 234*a-t*. Wireless radios 901*a-t* includes various components and hardware, as illustrated in FIG. 2 for base station 105, including modulator/demodulators 232*a-t*, MIMO detector 236, receive processor 238, transmit processor 220, and TX MIMO processor 230.

Memory 242 is configured to store instructions, data, or other information that enables joint sensing operations performed by the base station 105 and the UE 115. For example, memory 242 may store measurement logic 902 executable by controller/processor 240 to perform one or more network measurements using one or more operations described herein. As a particular example, the measurement logic 902 may be executable by controller/processor 240 to determine an amount of energy associated with one or more received signals, such as the beams B1, B2, and B3. Alternatively or in addition, the measurement logic 902 may be executable by controller/processor 240 to determine whether a blocking signal or a channel reservation message is detected.

FIG. 9 also illustrates that memory 242 is configured to store a condition detector 903. The condition detector 903 may be executable by the controller/processor 240 to determine whether the network-side medium access condition 514 is detected (or satisfied). For example, the condition detector 903 may be executable by the controller/processor 240 to compare an amount of energy of the beams B1, B2, and B3 to a threshold amount of energy to determine whether the network-side medium access condition 514 is detected (or satisfied). Alternatively or in addition, the condition detector 903 may be executable by the controller/processor 240 to determine whether a blocking signal or a channel reservation message indicates a conflict with a transmission to be performed by the base station 105, with a transmission to be performed by the UE 115, or both. The condition detector 903 may be executable by the controller/processor 240 to output a signal having either a first value (e.g., a logic "0" value or a logic "1" value) indicating failure to detect the network-side medium access condition 514 or a second value (e.g., a logic "1" value or a logic "0" value indicating detection of the network-side medium access condition 514.

According to some further aspects, in a first aspect, a method of wireless communication includes performing, by a user equipment (UE) device, a channel sensing operation during a first window of a frame period associated with a wireless communication network. Performing the channel sensing operation includes performing a direction-based scan of one or more beams associated with the wireless communication network, and the channel sensing operation is included in a joint sensing operation performed with a base station. The method further includes, based at least in part on a result of the channel sensing operation, determining whether to perform, during a second window of the frame period, one or more communication operations with the base station.

In a second aspect alternatively or in addition to the first aspect, the result indicates failure to detect a mobile-side medium access condition, a second result of a second channel sensing operation by the base station indicates failure to detect a network-side medium access condition, and the method includes determining to avoid communication during the second window of the frame period.

In a third aspect alternatively or in addition to one or more of the first through second aspects, the result indicates detection of a mobile-side medium access condition, a second result of a second channel sensing operation by the base station indicates failure to detect a network-side medium access condition, and the method includes determining to avoid communication during the second window of the frame period.

In a fourth aspect alternatively or in addition to one or more of the first through third aspects, the result indicates failure to detect a mobile-side medium access condition, a second result of a second channel sensing operation by the base station indicates detection of a network-side medium access condition, and the method includes: receiving, by the UE device, a control message from the base station during the second window of the frame period; and declining, by the UE device, to send an acknowledgement (ACK) of the control message to the base station.

In a fifth aspect alternatively or in addition to one or more of the first through fourth aspects, the result indicates detection of a mobile-side medium access condition, a second result of a second channel sensing operation by the base station indicates detection of a network-side medium access condition, and the method includes: receiving, by the UE device, a control message from the base station during the second window of the frame period; receiving, by the UE device, a channel occupancy time system information (COT-SI) signal during the frame period; and sending, by the UE device, an acknowledgement (ACK) of the control message to the base station in response to receiving the COT-SI signal.

In a sixth aspect alternatively or in addition to one or more of the first through fifth aspects, the result indicates detection of a mobile-side medium access condition, a second result of a second channel sensing operation by the base station indicates detection of a network-side medium access condition, the UE device fails to receive a channel occupancy time system information (COT-SI) signal during the frame period, and the method includes: receiving, by the UE device, a control message from the base station during the second window of the frame period; and declining to send, by the UE device, an acknowledgement (ACK) of the control message to the base station in response to failure to receive the COT-SI signal.

In a seventh aspect alternatively or in addition to one or more of the first through sixth aspects, the channel sensing operation and a second channel sensing operation by the base station are performed to determine whether the UE device is to receive data from the base station during the second window, to determine whether the UE device is to transmit data to the base station during the second window, or a combination thereof.

In an eighth aspect alternatively or in addition to one or more of the first through seventh aspects, the result indicates detection of a mobile-side medium access condition, a second result of a second channel sensing operation by the base station indicates failure to detect a network-side medium access condition, and the method includes: transmitting, by the UE device, a control signal to the base station during the second window, where the UE device avoids sending a data signal to the base station during the second window; and receiving, from the base station, data in response to failure of the base station to detect one or more blocking signals during the frame period.

In a ninth aspect alternatively or in addition to one or more of the first through eighth aspects, the control signal includes a sounding reference signal (SRS) transmitted via a physical uplink control channel (PUCCH) of the wireless communication network.

In a tenth aspect alternatively or in addition to one or more of the first through ninth aspects, the result indicates either success or failure of the channel sensing operation to detect a mobile-side medium access condition, a second result of a second channel sensing operation by the base station indicates detection of a network-side medium access condition, the UE device fails to receive a channel occupancy time system information (COT-SI) signal during the frame period, and further comprising: transmitting, by the UE device, a control signal to the base station during the second window, where the UE device avoids sending a data signal to the base station during the second window; and receiving, from the base station, data in response to failure of the base station to detect one or more blocking signals during the frame period.

In an eleventh aspect alternatively or in addition to one or more of the first through tenth aspects, the control signal includes a sounding reference signal (SRS) transmitted via a physical uplink control channel (PUCCH) of the wireless communication network.

In a twelfth aspect alternatively or in addition to one or more of the first through eleventh aspects, the result indicates failure to detect a mobile-side medium access condition, a second result of a second channel sensing operation by the base station indicates detection of a network-side medium access condition, and the method further includes: receiving, from the base station, a channel occupancy time system information (COT-SI) signal during the frame period; in response to receiving the COT-SI signal, sending, to the base station, an indication of failure of the channel sensing operation; and sending, to the base station, data in response to failure of the base station to detect a blocking signal, where the UE device avoids receiving data from the base station during the second window.

In a thirteenth aspect alternatively or in addition to one or more of the first through twelfth aspects, the result indicates detection of a mobile-side medium access condition, a second result of a second channel sensing operation by the base station indicates detection of a network-side medium access condition, and the method includes: receiving a channel occupancy time system information (COT-SI) signal from the base station; sending an acknowledgement (ACK) of the COT-SI signal to the base station; and receiving data during the second window from the base station in response to sending the ACK.

In a fourteenth aspect alternatively or in addition to one or more of the first through thirteenth aspects, a method of wireless communication includes performing, by a base station, a channel sensing operation during a first window of a frame period associated with a wireless communication network. Performing the channel sensing operation includes performing a direction-based scan of one or more beams associated with the wireless communication network, and the channel sensing operation is included in a joint sensing operation performed with a UE device. The method further includes determining, based at least in part on a result of the channel sensing operation, whether to perform, during a second window of the frame period, one or more communication operations with the UE device.

In a fifteenth aspect alternatively or in addition to one or more of the first through fourteenth aspects, the base station performs the channel sensing operation during a plurality of time slots of the first window, and the UE device performs a second channel sensing operation during each of the plurality of time slots.

In a sixteenth aspect alternatively or in addition to one or more of the first through fifteenth aspects, the base station performs the channel sensing operation during a plurality of time slots of the first window, and the UE device performs a second channel sensing operation during one of the plurality of time slots.

In a seventeenth aspect alternatively or in addition to one or more of the first through sixteenth aspects, the base station performs the channel sensing operation during a plurality of time slots of the first window, and the UE device performs a second channel sensing operation after the plurality of time slots.

In an eighteenth aspect alternatively or in addition to one or more of the first through seventeenth aspects, the method includes sending, from the base station to the UE device, an indication of success of the channel sensing operation performed by the base station, and the UE device performs the second channel sensing operation in response to the indication of success.

In a nineteenth aspect alternatively or in addition to one or more of the first through eighteenth aspects, the method includes receiving, at the base station from the UE device, a message indicating the second result of the second channel sensing operation performed by the UE device.

In a twentieth aspect alternatively or in addition to one or more of the first through nineteenth aspects, a second channel sensing operation by the UE device and the channel sensing operation by the base station are performed to determine whether the base station is to send data to the UE device during the second window.

In a twenty-first aspect alternatively or in addition to one or more of the first through twentieth aspects, an apparatus for wireless communication includes at least one processor and a memory coupled to the at least one processor. The at least one processor is configured to initiate a channel sensing operation at a UE device during a first window of a frame period associated with a wireless communication network. Performing the channel sensing operation includes performing a direction-based scan of one or more beams associated with the wireless communication network, and the channel sensing operation is included in a joint sensing operation performed with a base station. The at least one processor is further configured to determine, based at least in part on a result of the channel sensing operation, whether to perform, during a second window of the frame period, one or more communication operations with the base station.

In a twenty-second aspect alternatively or in addition to one or more of the first through twenty-first aspects, the result indicates failure to detect a mobile-side medium access condition, a second result of a second channel sensing operation by the base station indicates failure to detect a network-side medium access condition, and the at least one processor is further configured to determine to avoid communication during the second window of the frame period.

In a twenty-third aspect alternatively or in addition to one or more of the first through twenty-second aspects, the result indicates detection of a mobile-side medium access condition, a second result of a second channel sensing operation by the base station indicates failure to detect a network-side medium access condition, and the at least one processor is further configured to determine to avoid communication during the second window of the frame period.

In a twenty-fourth aspect alternatively or in addition to one or more of the first through twenty-third aspects, the result indicates failure to detect a mobile-side medium access condition, a second result of a second channel sensing operation by the base station indicates detection of a network-side medium access condition, and the at least one processor is further configured to: receive a control message from the base station during the second window of the frame period; and decline to send an acknowledgement (ACK) of the control message to the base station.

In a twenty-fifth aspect alternatively or in addition to one or more of the first through twenty-fourth aspects, the result indicates detection of a mobile-side medium access condition, a second result of a second channel sensing operation by the base station indicates detection of a network-side medium access condition, and the at least one processor is further configured to: receive a control message from the base station during the second window of the frame period; receive a channel occupancy time system information (COT-SI) signal during the frame period; and send an acknowledgement (ACK) of the control message to the base station in response to receiving the COT-SI signal.

In a twenty-sixth aspect alternatively or in addition to one or more of the first through twenty-fifth aspects, the result indicates detection of a mobile-side medium access condition, a second result of a second channel sensing operation by the base station indicates detection of a network-side medium access condition, the UE device fails to receive a channel occupancy time system information (COT-SI) signal during the frame period, and the at least one processor is further configured to: receive a control message from the base station during the second window of the frame period; and decline to send an acknowledgement (ACK) of the control message to the base station in response to failure to receive the COT-SI signal.

In a twenty-seventh aspect alternatively or in addition to one or more of the first through twenty-sixth aspects, the channel sensing operation and a second channel sensing operation by the base station are performed to determine whether the UE device is to receive data from the base station during the second window, to determine whether the UE device is to transmit data to the base station during the second window, or a combination thereof.

In a twenty-eighth aspect alternatively or in addition to one or more of the first through twenty-seventh aspects, an apparatus for wireless communication includes at least one processor and a memory coupled to the at least one processor. The at least one processor is configured to initiate a channel sensing operation at a base station during a first window of a frame period associated with a wireless communication network. Performing the channel sensing operation includes performing a direction-based scan of one or more beams associated with the wireless communication network, and the channel sensing operation is included in a joint sensing operation performed with a UE device. The at least one processor is further configured to determine, based at least in part on a result of the channel sensing operation, whether to perform, during a second window of the frame period, one or more communication operations with the UE device.

In a twenty-ninth aspect alternatively or in addition to one or more of the first through twenty-eighth aspects, the wireless communication network includes any of a sub-7 gigahertz (GHz) wireless communication network, a fourth-generation unlicensed long-term evolution (4G LTE-U) wireless communication network, or a fifth-generation new radio unlicensed (5G NR-U) wireless communication network.

In a thirtieth aspect alternatively or in addition to one or more of the first through twenty-ninth aspects, the frame period further includes an idle period prior to the first window.

In a thirty-first aspect alternatively or in addition to one or more of the first through thirtieth aspects, an apparatus (e.g., the UE 115) for wireless communication includes means (e.g., any of the wireless radios 801*a-r*) for performing a channel sensing operation at a UE device during a first window of a frame period associated with a wireless communication network. Performing the channel sensing operation includes performing a direction-based scan of one or more beams associated with the wireless communication network, and the channel sensing operation is included in a joint sensing operation performed with a base station. The apparatus further includes means (e.g., the controller/processor 280) for determining, based at least in part on a result of the channel sensing operation, whether to perform, during a second window of the frame period, one or more communication operations with the base station.

In a thirty-second aspect alternatively or in addition to one or more of the first through thirty-first aspects, an apparatus (e.g., the base station 105) for wireless communication includes means (e.g., any of the wireless radios 901*a-t*) for performing a channel sensing operation at a base station during a first window of a frame period associated with a wireless communication network. Performing the channel sensing operation includes performing a direction-based scan of one or more beams associated with the wireless communication network, and the channel sensing operation is included in a joint sensing operation performed with a UE device. The apparatus further includes means (e.g., the controller/processor 240) for determining, based at least in part on a result of the channel sensing operation, whether to perform, during a second window of the frame period, one or more communication operations with the UE device.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The functional blocks and modules in FIGS. 6 and 7 may comprise processors, electronics devices, hardware devices, electronics components, logical circuits, memories, software codes, firmware codes, etc., or any combination thereof.

Those of skill would further appreciate that the various illustrative logical blocks, modules, circuits, and algorithm steps described in connection with the disclosure herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure. Skilled artisans will also readily recognize that the order or combination of components, methods, or interactions that are described herein are merely examples and that the components, methods, or interactions of the various aspects of the present disclosure may be combined or performed in ways other than those illustrated and described herein.

The various illustrative logical blocks, modules, and circuits described in connection with the disclosure herein may be implemented or performed with a general-purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the disclosure herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

In one or more exemplary designs, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. Computer-readable storage media may be any available media that can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

As used herein, including in the claims, the term "and/or," when used in a list of two or more items, means that any one of the listed items can be employed by itself, or any combination of two or more of the listed items can be employed. For example, if a composition is described as containing components A, B, and/or C, the composition can contain A alone; B alone; C alone; A and B in combination; A and C in combination; B and C in combination; or A, B, and C in combination. Also, as used herein, including in the claims, "or" as used in a list of items prefaced by "at least one of" indicates a disjunctive list such that, for example, a list of "at least one of A, B, or C" means A or B or C or AB or AC or BC or ABC (i.e., A and B and C) or any of these in any combination thereof.

The previous description of the disclosure is provided to enable any person skilled in the art to make or use the disclosure. Various modifications to the disclosure will be readily apparent to those skilled in the art, and the generic principles defined herein may be applied to other variations without departing from the spirit or scope of the disclosure. Thus, the disclosure is not intended to be limited to the examples and designs described herein but is to be accorded the widest scope consistent with the principles and novel features disclosed herein.

The invention claimed is:

1. A method of wireless communication, comprising:
performing, by a user equipment (UE) device, a channel sensing operation during a first window of a frame period associated with a wireless communication network, wherein performing the channel sensing operation includes performing a direction-based scan of one or more beams associated with the wireless communication network, and wherein the channel sensing operation is included in a joint sensing operation performed with a base station; and
based at least in part on a result of the channel sensing operation, determining whether to perform, during a second window of the frame period, one or more communication operations with the base station.

2. The method of claim 1, wherein the result indicates failure to detect a mobile-side medium access condition, wherein a second result of a second channel sensing operation by the base station indicates failure to detect a network-side medium access condition, and further comprising determining to avoid communication during the second window of the frame period.

3. The method of claim 1, wherein the result indicates detection of a mobile-side medium access condition, wherein a second result of a second channel sensing operation by the base station indicates failure to detect a network-side medium access condition, and further comprising determining to avoid communication during the second window of the frame period.

4. The method of claim 1, wherein the result indicates failure to detect a mobile-side medium access condition, wherein a second result of a second channel sensing operation by the base station indicates detection of a network-side medium access condition, and further comprising:
receiving, by the UE device, a control message from the base station during the second window of the frame period; and
declining, by the UE device, to send an acknowledgement (ACK) of the control message to the base station.

5. The method of claim 1, wherein the result indicates detection of a mobile-side medium access condition, wherein a second result of a second channel sensing operation by the base station indicates detection of a network-side medium access condition, and further comprising:
receiving, by the UE device, a control message from the base station during the second window of the frame period;
receiving, by the UE device, a channel occupancy time system information (COT-SI) signal during the frame period; and
sending, by the UE device, an acknowledgement (ACK) of the control message to the base station in response to receiving the COT-SI signal.

6. The method of claim 1, wherein the result indicates detection of a mobile-side medium access condition, wherein a second result of a second channel sensing operation by the base station indicates detection of a network-side medium access condition, wherein the UE device fails to receive a channel occupancy time system information (COT-SI) signal during the frame period, and further comprising:
receiving, by the UE device, a control message from the base station during the second window of the frame period; and
declining to send, by the UE device, an acknowledgement (ACK) of the control message to the base station in response to failure to receive the COT-SI signal.

7. The method of claim 1, wherein the channel sensing operation and a second channel sensing operation by the base station are performed to determine whether the UE device is to receive data from the base station during the second window, to determine whether the UE device is to transmit data to the base station during the second window, or a combination thereof.

8. The method of claim 1, wherein the result indicates detection of a mobile-side medium access condition, wherein a second result of a second channel sensing operation by the base station indicates failure to detect a network-side medium access condition, and further comprising:
transmitting, by the UE device, a control signal to the base station during the second window, wherein the UE device avoids sending a data signal to the base station during the second window; and
receiving, from the base station, data in response to failure of the base station to detect one or more blocking signals during the frame period.

9. The method of claim 8, wherein the control signal includes a sounding reference signal (SRS) transmitted via a physical uplink control channel (PUCCH) of the wireless communication network.

10. The method of claim 1, wherein the result indicates either success or failure of the channel sensing operation to detect a mobile-side medium access condition, wherein a second result of a second channel sensing operation by the base station indicates detection of a network-side medium access condition, wherein the UE device fails to receive a channel occupancy time system information (COT-SI) signal during the frame period, and further comprising:
transmitting, by the UE device, a control signal to the base station during the second window, wherein the UE device avoids sending a data signal to the base station during the second window; and
receiving, from the base station, data in response to failure of the base station to detect one or more blocking signals during the frame period.

11. The method of claim 10, wherein the control signal includes a sounding reference signal (SRS) transmitted via a physical uplink control channel (PUCCH) of the wireless communication network.

12. The method of claim 1, wherein the result indicates failure to detect a mobile-side medium access condition, wherein a second result of a second channel sensing operation by the base station indicates detection of a network-side medium access condition, and further comprising:
receiving, from the base station, a channel occupancy time system information (COT-SI) signal during the frame period;
in response to receiving the COT-SI signal, sending, to the base station, an indication of failure of the channel sensing operation; and
sending, to the base station, data in response to failure of the base station to detect a blocking signal, wherein the UE device avoids receiving data from the base station during the second window.

13. The method of claim 1, wherein the result indicates detection of a mobile-side medium access condition, wherein a second result of a second channel sensing operation by the base station indicates detection of a network-side medium access condition, and further comprising:
receiving a channel occupancy time system information (COT-SI) signal from the base station;
sending an acknowledgement (ACK) of the COT-SI signal to the base station; and
receiving data during the second window from the base station in response to sending the ACK.

14. A method of wireless communication, comprising:
performing, by a base station, a channel sensing operation during a first window of a frame period associated with a wireless communication network, wherein performing the channel sensing operation includes performing a direction-based scan of one or more beams associated with the wireless communication network, and wherein the channel sensing operation is included in a joint sensing operation performed with a user equipment (UE) device; and
based at least in part on a result of the channel sensing operation, determining whether to perform, during a second window of the frame period, one or more communication operations with the UE device.

15. The method of claim 14, wherein the base station performs the channel sensing operation during a plurality of time slots of the first window, and wherein the UE device performs a second channel sensing operation during each of the plurality of time slots.

16. The method of claim 14, wherein the base station performs the channel sensing operation during a plurality of time slots of the first window, and wherein the UE device performs a second channel sensing operation during one of the plurality of time slots.

17. The method of claim 14, wherein the base station performs the channel sensing operation during a plurality of time slots of the first window, and wherein the UE device performs a second channel sensing operation after the plurality of time slots.

18. The method of claim 17, further comprising sending, from the base station to the UE device, an indication of success of the channel sensing operation performed by the base station, and wherein the UE device performs the second channel sensing operation in response to the indication of success.

19. The method of claim 17, further comprising receiving, at the base station from the UE device, a message indicating the second result of the second channel sensing operation performed by the UE device.

20. The method of claim 14, wherein a second channel sensing operation by the UE device and the channel sensing operation by the base station are performed to determine whether the base station is to send data to the UE device during the second window.

21. An apparatus for wireless communication, the apparatus comprising:
at least one processor; and
a memory coupled to the at least one processor, wherein the at least one processor is configured to:
initiate a channel sensing operation at a user equipment (UE) device during a first window of a frame period associated with a wireless communication network, wherein performing the channel sensing operation includes performing a direction-based scan of one or more beams associated with the wireless communication network, and wherein the channel sensing operation is included in a joint sensing operation performed with a base station; and
determine, based at least in part on a result of the channel sensing operation, whether to perform, during a second window of the frame period, one or more communication operations with the base station.

22. The apparatus of claim 21, wherein the result indicates failure to detect a mobile-side medium access condition, wherein a second result of a second channel sensing operation by the base station indicates failure to detect a network-side medium access condition, and wherein the at least one processor is further configured to determine to avoid communication during the second window of the frame period.

23. The apparatus of claim 21, wherein the result indicates detection of a mobile-side medium access condition, wherein a second result of a second channel sensing operation by the base station indicates failure to detect a network-side medium access condition, and wherein the at least one processor is further configured to determine to avoid communication during the second window of the frame period.

24. The apparatus of claim 21, wherein the result indicates failure to detect a mobile-side medium access condition, wherein a second result of a second channel sensing operation by the base station indicates detection of a network-side medium access condition, and wherein the at least one processor is further configured to:
receive a control message from the base station during the second window of the frame period; and
decline to send an acknowledgement (ACK) of the control message to the base station.

25. The apparatus of claim 21, wherein the result indicates detection of a mobile-side medium access condition, wherein a second result of a second channel sensing operation by the base station indicates detection of a network-side medium access condition, and wherein the at least one processor is further configured to:
receive a control message from the base station during the second window of the frame period;
receive a channel occupancy time system information (COT-SI) signal during the frame period; and
send an acknowledgement (ACK) of the control message to the base station in response to receiving the COT-SI signal.

26. The apparatus of claim 21, wherein the result indicates detection of a mobile-side medium access condition, wherein a second result of a second channel sensing operation by the base station indicates detection of a network-side medium access condition, wherein the UE device fails to receive a channel occupancy time system information (COT-SI) signal during the frame period, and wherein the at least one processor is further configured to:
receive a control message from the base station during the second window of the frame period; and
decline to send an acknowledgement (ACK) of the control message to the base station in response to failure to receive the COT-SI signal.

27. The apparatus of claim 21, wherein the channel sensing operation and a second channel sensing operation by the base station are performed to determine whether the UE device is to receive data from the base station during the second window, to determine whether the UE device is to transmit data to the base station during the second window, or a combination thereof.

28. An apparatus for wireless communication, the apparatus comprising:
at least one processor; and
a memory coupled to the at least one processor, wherein the at least one processor is configured to:
initiate a channel sensing operation at a base station during a first window of a frame period associated with a wireless communication network, wherein performing the channel sensing operation includes performing a direction-based scan of one or more beams associated with the wireless communication network, and wherein the channel sensing operation is included in a joint sensing operation performed with a user equipment (UE) device; and
determine, based at least in part on a result of the channel sensing operation, whether to perform, during a second window of the frame period, one or more communication operations with the UE device.

29. The apparatus of claim 28, wherein the wireless communication network includes any of a sub-7 gigahertz (GHz) wireless communication network, a fourth-generation unlicensed long-term evolution (4G LTE-U) wireless communication network, or a fifth-generation new radio unlicensed (5G NR-U) wireless communication network.

30. The apparatus of claim 28, wherein the frame period further includes an idle period prior to the first window.

* * * * *